United States Patent
Zhou et al.

(10) Patent No.: US 12,149,321 B2
(45) Date of Patent: Nov. 19, 2024

(54) PARTIAL BEAM FAILURE REPORT

(71) Applicant: QUALCOMM Incorporated, San Diego, CA (US)

(72) Inventors: Shanyu Zhou, San Diego, CA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/449,938

(22) Filed: Oct. 4, 2021

(65) Prior Publication Data

US 2023/0106678 A1   Apr. 6, 2023

(51) Int. Cl.
  *H04B 7/08* (2006.01)
  *H04L 1/20* (2006.01)
  *H04W 24/10* (2009.01)
  *H04W 76/19* (2018.01)

(52) U.S. Cl.
  CPC ........... *H04B 7/088* (2013.01); *H04L 1/203* (2013.01); *H04W 24/10* (2013.01); *H04W 76/19* (2018.02)

(58) Field of Classification Search
  CPC ..... H04B 7/088; H04B 7/06964; H04L 1/203; H04W 24/10; H04W 76/19; H04W 24/08
  See application file for complete search history.

(56) References Cited

U.S. PATENT DOCUMENTS

| | | | | |
|---|---|---|---|---|
| 2019/0297648 A1* | 9/2019 | Nagaraja | ........... | H04B 7/063 |
| 2020/0336195 A1* | 10/2020 | Hu | ........... | H04B 7/0408 |
| 2021/0029570 A1* | 1/2021 | Kwon | ........... | H04W 16/28 |
| 2021/0314218 A1* | 10/2021 | Kang | ........... | H04B 7/0695 |
| 2022/0132517 A1* | 4/2022 | Zhu | ........... | H04L 5/005 |
| 2023/0300645 A1* | 9/2023 | Kwak | ........... | H04L 5/0091 |
| | | | | 370/242 |

OTHER PUBLICATIONS

Huawei, HiSilicon, "Beam failure recovery for Scell", 3GPP TSG RAN WG1 Meeting #95, Spokane, USA, R1-1813561, Nov. 12-16, 2018 (Year: 2018).*
Asustek, "PHY notification for beam failure instance", 3GPP TSG RAN WG1 Meeting #92b, R1-1804085, Sanya, China, Apr. 16-Apr. 20, 2018 (Year: 2018).*

* cited by examiner

*Primary Examiner* — Ayaz R Sheikh
*Assistant Examiner* — Mang Boi Thawng
(74) *Attorney, Agent, or Firm* — Procopio, Cory, Hargreaves & Savitch LLP

(57) ABSTRACT

A user equipment (UE) may perform a beam failure procedure per beam of multiple beams and transmit, to a base station, a partial beam failure (BF) report. The base station may transmit, to the UE, a configuration of the partial BF report, and the UE may generate and transmit the partial BF report for the base station to perform the beam management. The parameters of the aperiodic partial BF report may be configured with the same or different parameters for each beam. The partial BF report may include at least one of a current beam failure indication (BFI) count or a channel measurement for each beam. The partial BF report may be transmitted periodically or aperiodically.

30 Claims, 12 Drawing Sheets

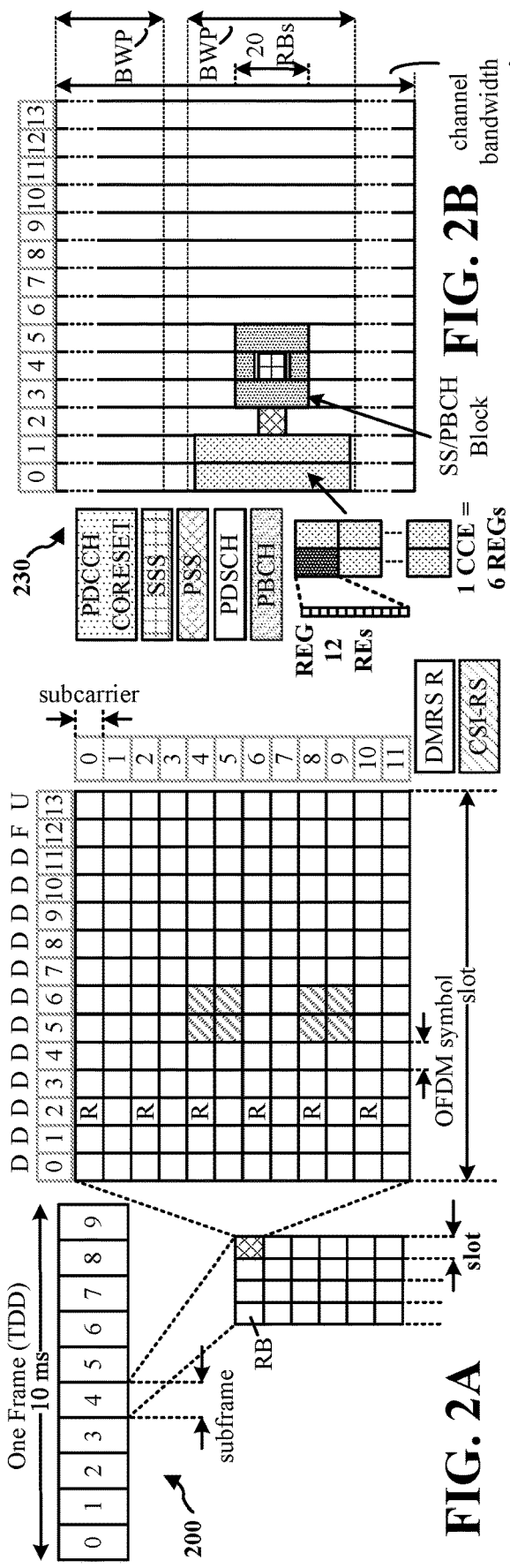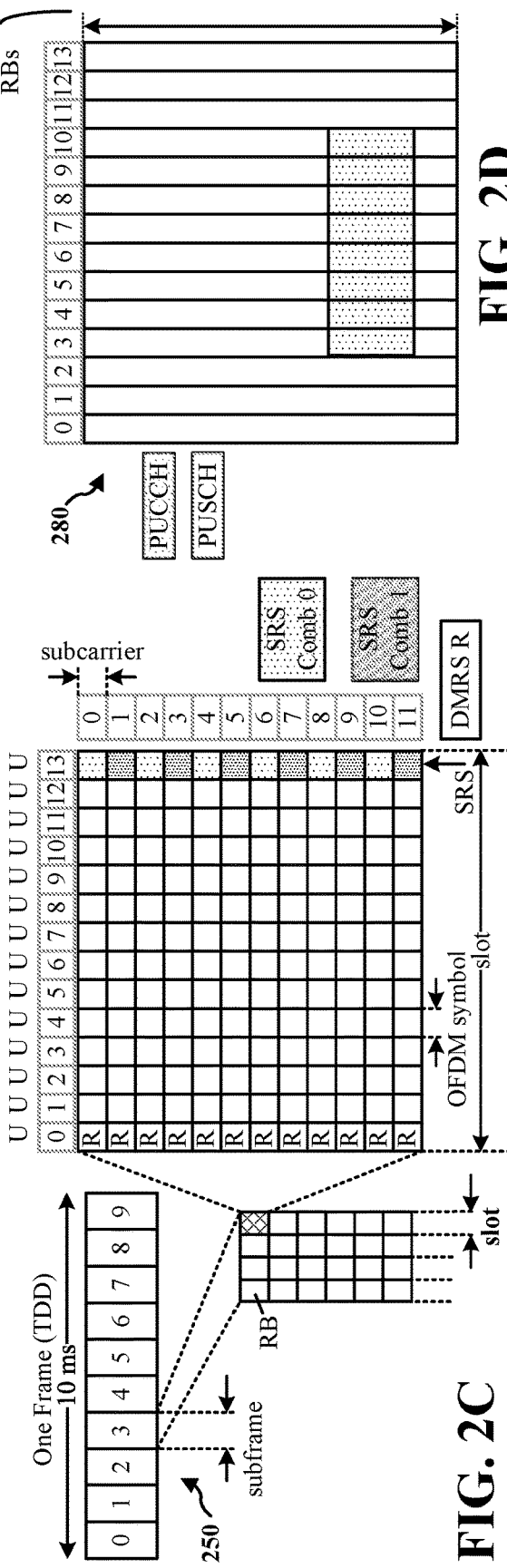

PARTIAL BEAM FAILURE REPORT

TECHNICAL FIELD

The present disclosure relates generally to communication systems, and more particularly, to a method of wireless communication including a partial beam failure report in a multiple beam system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE) configured with multiple beams. The UE may perform beam failure procedure per beam of the multiple beams and transmit, to a base station, a partial beam failure (BF) report. The base station may transmit, to the UE, a configuration of the partial BF report, and the UE may generate and transmit the partial BF report for the base station to perform the beam management. The parameters of the aperiodic partial BF report may be configured with the same or different parameters for each beam. The partial BF report may include at least one of a current beam failure indicator (BFI) count or a channel measurement for each beam. The partial BF report may be transmitted periodically or aperiodically.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
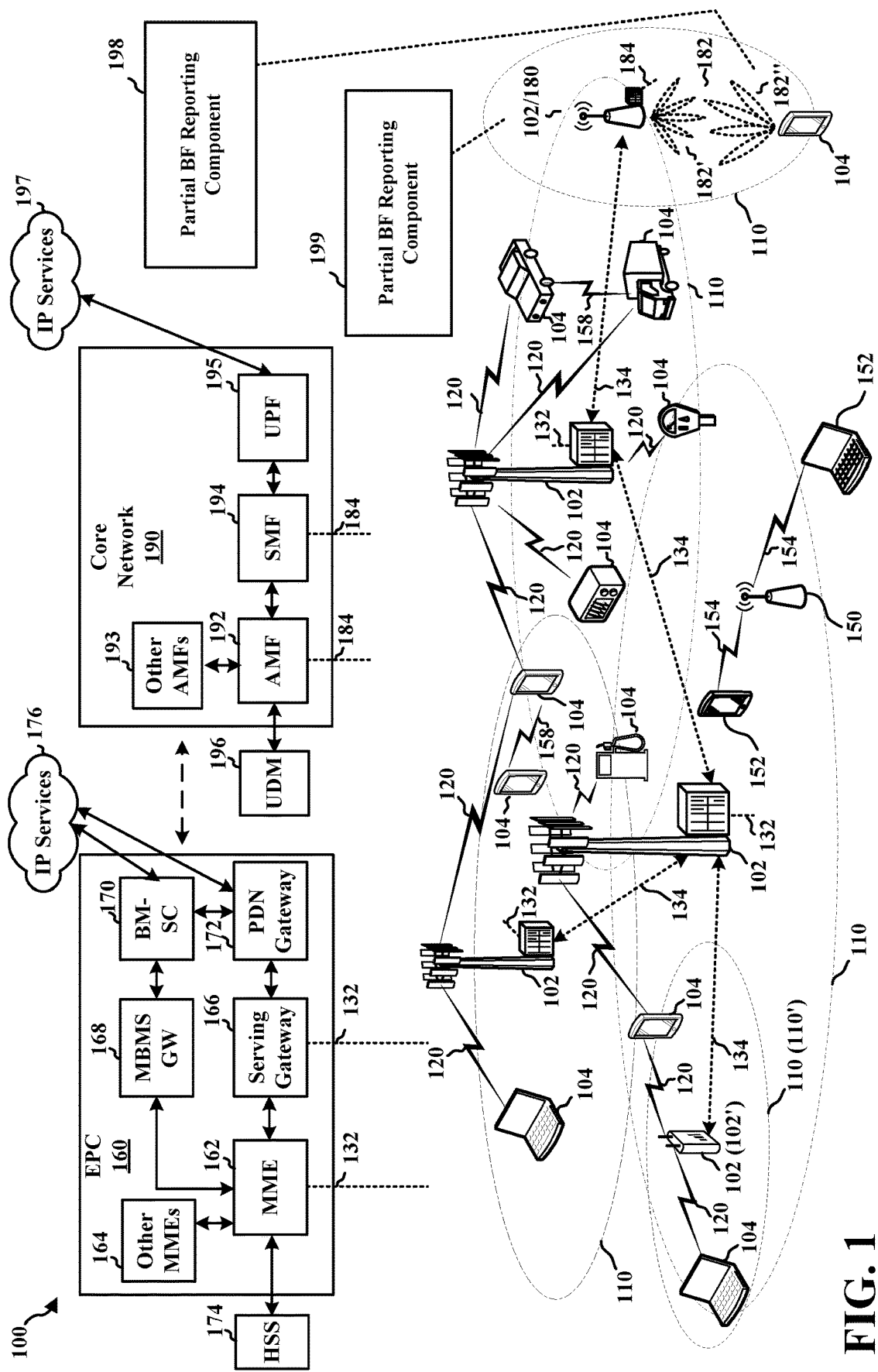
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a partial BF reporting component 198 configured to receive, from a base station, two or more RSs via two or more beams, each of the two or more RSs being received via, generate at least one BFI count, each of the at least one BFI count generated for each of the two or more beams based on an estimation of a corresponding RS being greater than a threshold estimation value, and transmit, to the base station, a partial beam failure (BF) report of the two or more beams, the partial BF report including the at least one BFI count. In certain aspects, the base station 180 may include the partial BF reporting component 199 configured to transmit, to a UE, two or more RSs via two or more beams, each of the two or more RSs being transmitted via, and receive, from the UE, a partial BF report of the two or more beams transmitted to the UE, the partial BF report including at least one BFI count, each of the at least one BFI count generated for each of the two or more beams based on an estimation of a corresponding RS at the UE being greater than a threshold estimation value. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and $2^\mu$ slots/subframe. The subcarrier spacing may be equal to $2^\mu * 15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
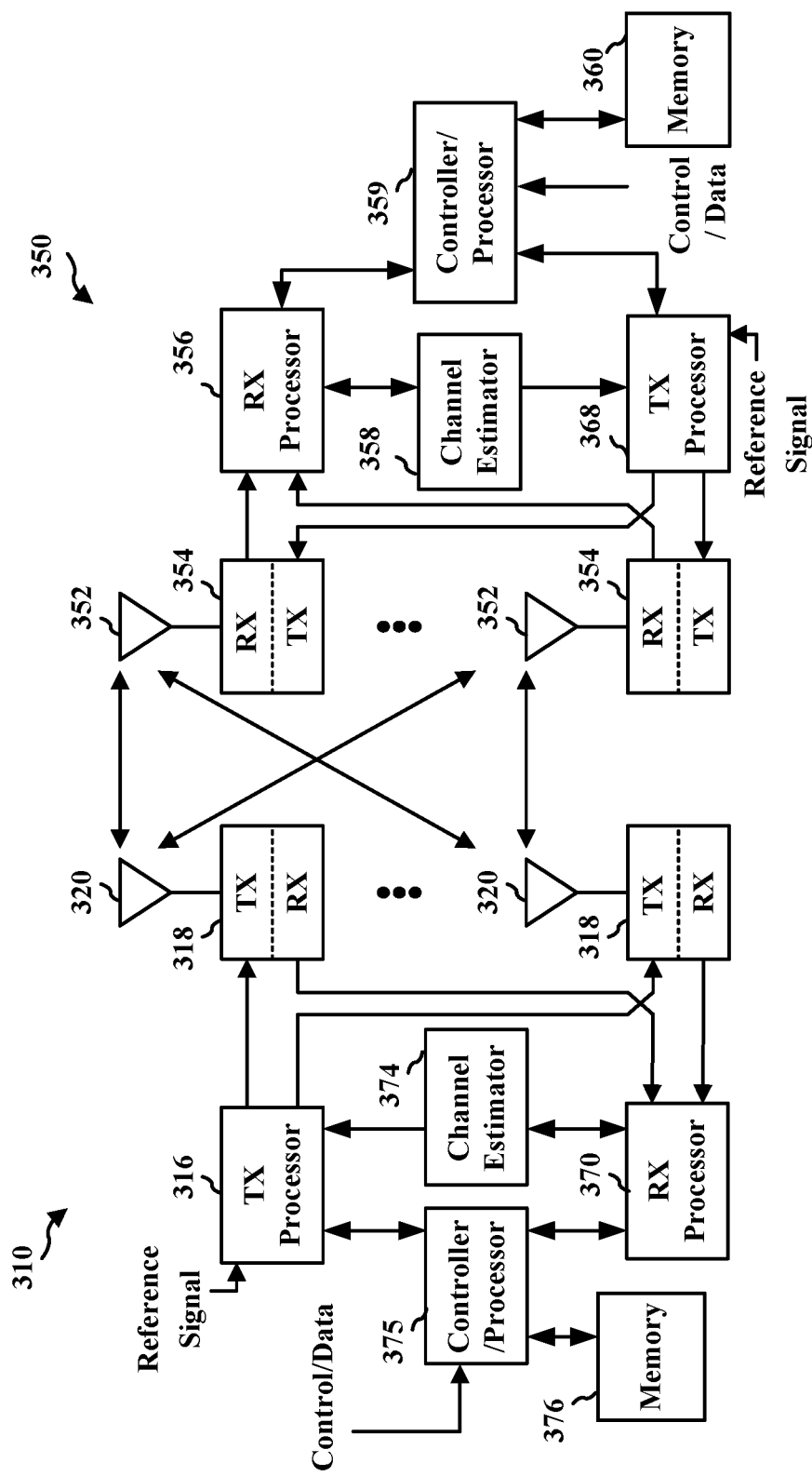
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In a multiple beam system including a base station and a UE, two or more beams may be formed between the base station and the UE to perform wireless communication. In some aspects, the base station may configure the UE with a beam failure detection (BDF) reference signal (RS) (BFD-RS) set that may contain multiple beams for the UE to monitor for BFD or beam failure recovery (BFR) purposes. The UE may monitor each BFD-RS in the BFD-RS set using one corresponding beam. That is, each BDF-RS may be transmitted to the UE via a corresponding beam, and the UE may monitor each BFD-RS for the BFD or BFR purposes. The UE may measure the block error rate (BLER) of each BFD-RS of the corresponding beam, and perform the BFD or the BFR. In one aspect, the UE may compare the estimated BLER of each BFD-RS of the corresponding beam, and trigger the beam failure indicator (BFI) based on at least one of the estimated BLERs of the BFD-RS set being greater than a threshold value. For example, the threshold value may be a threshold BLER value.

Figure 4:
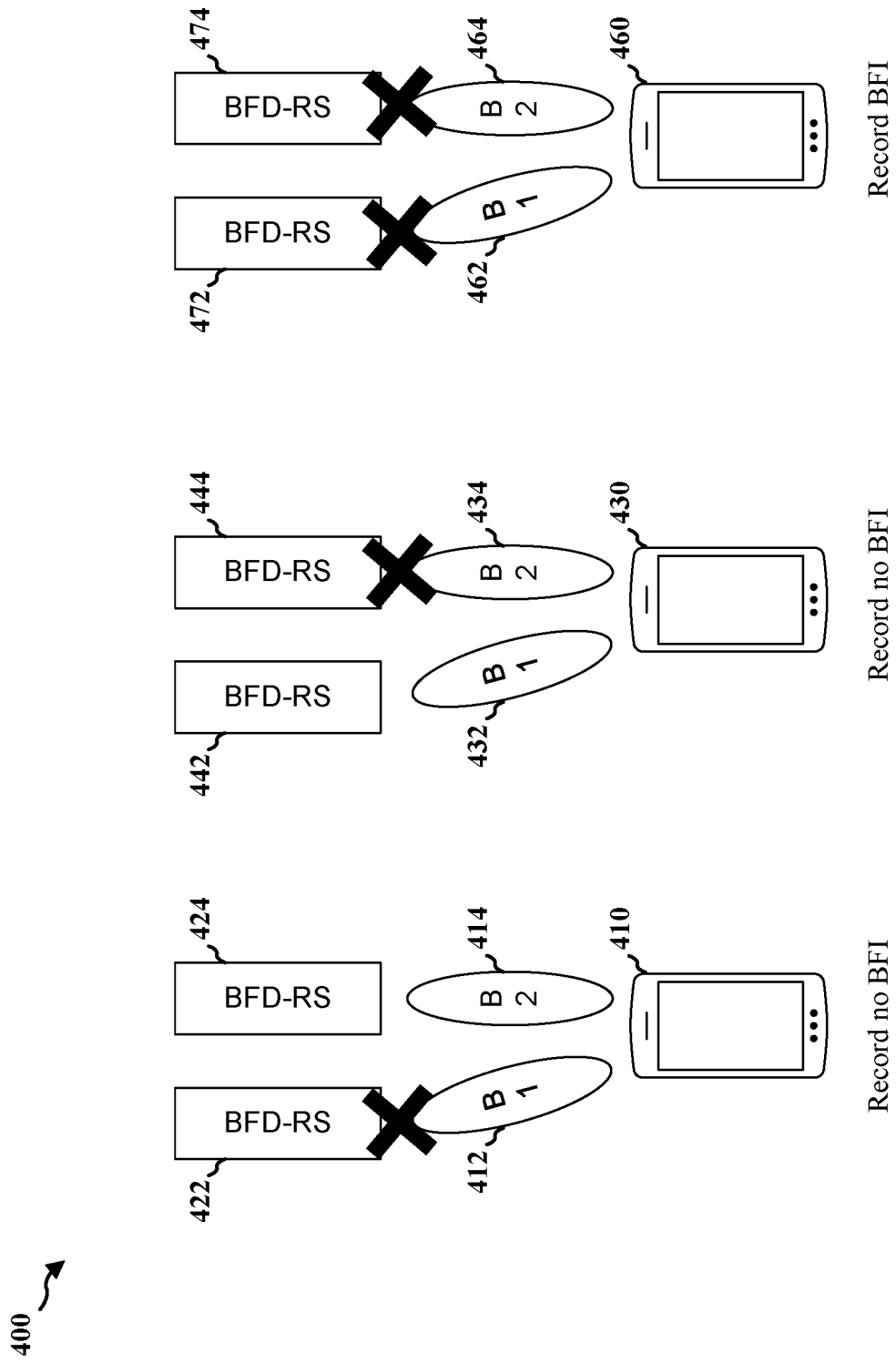
FIG. 4 is a method of beam failure detection of wireless communication.

FIG. 4 is a method of beam failure detection 400 of wireless communication. The method of beam failure detection 400 indicates beam failure detection at a first UE 410, a second UE 430, and a third UE 460. The UE may measure each beam to estimate the corresponding BFD-RS, and estimate the BLER of the BFD-RS. The UE may determine that a beam radio quality of a beam falls below a threshold value based on the estimated BLER of the corresponding BFD-RS of the beam is greater than the threshold BLER value. The UE may report a beam failure indicator (BFI)

based on determining that the beam radio quality of all the beams falls below the threshold value. That is, the UE may report the BFI based on determining that all the BLER of the BFD-RS set is greater than the threshold BLER value.

In one aspect, the first UE 410 may be configured with a first beam 412 and a second beam 414, and a first BFD-RS 422 may be transmitted via the first beam 412, and a second BFD-RS 424 may be transmitted via the second beam 414. The UE 410 may measure a first BLER of the first BFD-RS 422 received via the first beam 412 and measure a second BLER of the second BFD-RS 424 received via the second beam 414. For example, the UE may determine that the first BLER of the first BFD-RS 422 received via the first beam 412 is greater than the threshold BLER value, and that the second BLER of the second BFD-RS 424 received via the second beam 414 is less than or equal to the threshold BLER value. Since the first UE 410 determines that the beam radio quality of all the beams did not fall below the threshold value, first the UE 410 may not record the BFI.

In another aspect, the second UE 430 may be configured with a first beam 432 and a second beam 434, and a first BFD-RS 442 may be transmitted via the first beam 432, and a second BFD-RS 444 may be transmitted via the second beam 434. The UE 430 may measure a first BLER of the first BFD-RS 442 received via the first beam 432 and measure a second BLER of the second BFD-RS 444 received via the second beam 434. For example, the UE may determine that the first BLER of the first BFD-RS 442 received via the first beam 432 is less than or equal to the threshold BLER value, and that the second BLER of the second BFD-RS 444 received via the second beam 434 is greater than the threshold BLER value. Since the second UE 430 determines that the beam radio quality of all the beams did not fall below the threshold value, the second UE 430 may not record the BFI.

In another aspect, the third UE 460 may be configured with a first beam 462 and a second beam 464, and a first BFD-RS 472 may be transmitted via the first beam 462, and a second BFD-RS 474 may be transmitted via the second beam 464. The UE 460 may measure a first BLER of the first BFD-RS 472 received via the first beam 462 and measure a second BLER of the second BFD-RS 474 received via the second beam 464. For example, the UE may determine that the first BLER of the first BFD-RS 472 received via the first beam 462 is greater than the threshold BLER value, and that the second BLER of the second BFD-RS 474 received via the second beam 464 is greater than the threshold BLER value. Since the third UE 460 determines that the beam radio quality of all the beams did not fall below the threshold value, the third UE 460 may record the BFI.

Based on the BFI reporting from the physical layer, the MAC layer of the UE may generate or maintain a BFI count and a BFI timer. In one aspect, based on receiving the first BFI report, the MAC layer of the UE may start the BFI timer and increase the BFI count. While the BFI timer runs, the MAC layer maintains the BFI count. In one aspect, the MAC layer of the base station may determine that the BFI count reaches the maximum BFI count threshold, and the MAC layer of the UE may declare a beam failure. Based on the beam failure declaration, the UE may initiate the beam failure report or the beam failure recovery procedure. In one example, the UE may transmit a beam failure report to the base station for the base station to perform beam management. In another example, the UE may perform a beam failure recovery procedure including initiating a random access procedure with the base station.

Figure 5:
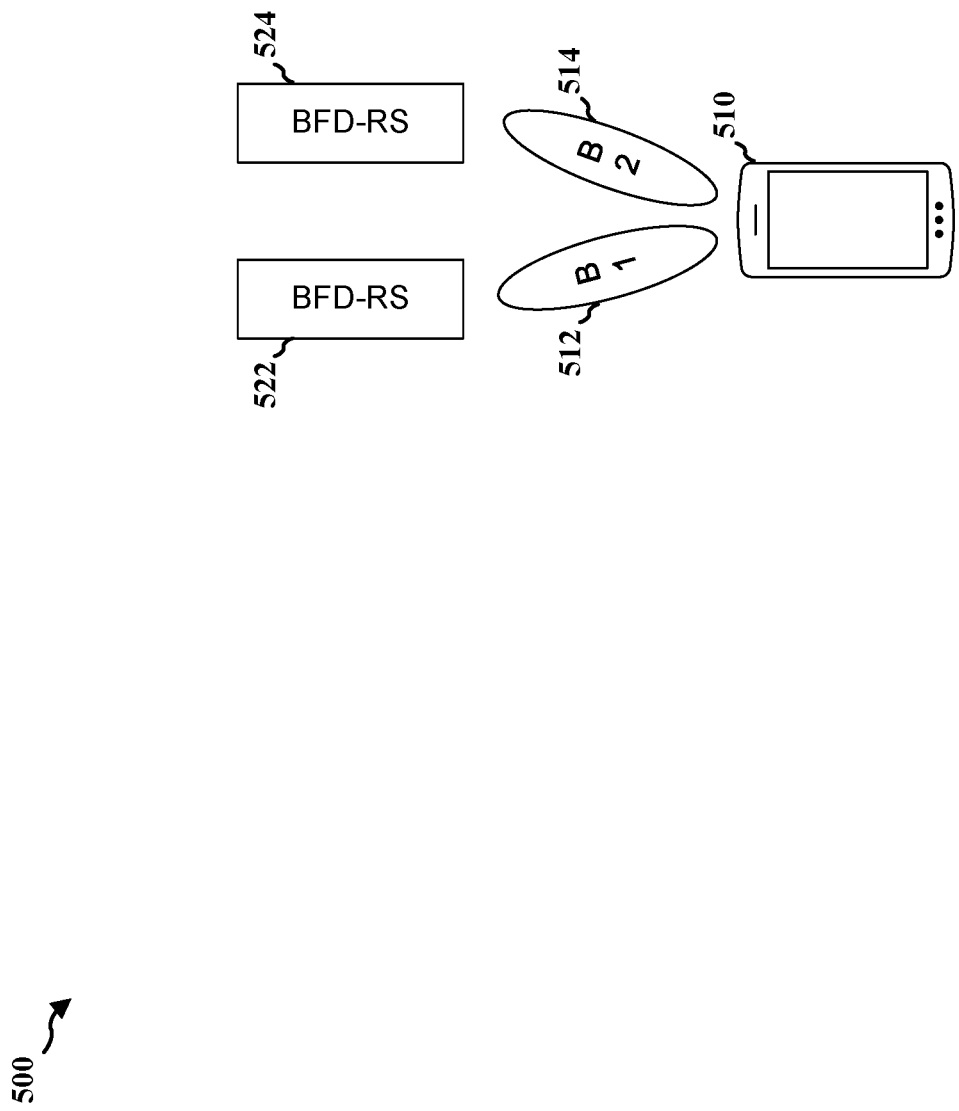
FIG. 5 is a method of partial beam failure (BF) reporting of wireless communication.

FIG. 5 is a method of partial BF report 500 of wireless communication. In some aspects, the UE may perform an individual BFD process per beam. That is, the UE may report the BFI based on each beam, perform the BFR process per beam, and report a partial BF report to the base station. The UE may receive two or more BFR-RSs via two or more beams, where each of the two or more BFR-RSs are received via each of the two or more beams. That is, the UE may determine whether the beam radio quality of each beam falls below a threshold value, and report a BFI to the MAC layer of the UE individually for each beam. For example, the UE may determine that the beam radio quality of each beam falls below a threshold value based on the estimated BLER being greater than a threshold BLER value. The threshold BLER value may be configured the same for all beams, or configured individually for each beam.

For example, the UE 510 may be configured with a first beam 512 and a second beam 514, and a first BFD-RS 522 may be received via the first beam 512 and the second BFD-RS 522 may be received via the second beam 514. In some aspects, the base station may configure the UE 510 with the individual BFD process per beam and the partial BF report. The UE 510 may measure the BFD-RS for each beam and undergo or perform an individual BFD process. At the physical layer level, the UE 510 may measure the first BFD-RS 522 received via the first beam 512 to estimate a first BLER, and measure the second BFD-RS 524 received via the second beam 514 to estimate the second BLER. The UE 510 may individually compare the estimated first BLER and the estimated second BLER to the corresponding threshold BLER value. That is, the UE 510 may compare the estimated first BLER to a first threshold BLER value and the estimated second BLER to a second threshold BLER value.

The physical layer of the UE 510 may transmit, to the MAC layer, a BFI report for each beam based on the estimated BLER of the corresponding beam being greater than the threshold BLER value of the corresponding beam. That is, the physical layer of the UE 510 may transmit, to the MAC layer, a first BFI report for the first beam 512 based on the estimated first BLER of the first beam 512 being greater than the first threshold BLER value and/or a second BFI report for the second beam 514 based on the estimated second BLER of the second beam 514 being greater than the second threshold BLER value. The physical layer of the UE 510 may not transmit a BFI report for each beam if the channel condition for the corresponding beam is maintained to be better than a threshold value. That is, the physical layer of the UE 510 may not transmit a BFI report for each beam based on the estimated BLER of the corresponding beam being less than or equal to the threshold BLER value of the corresponding beam.

The MAC layer of the UE 510 may receive the BFI report from the physical layer, and maintain a BFI count per each beam. The UE 510 may be configured with a BFI timer and a maximum BFI count threshold for each beam, and maintain the BFI counter and generate the partial BF report based on the BFI timer and the maximum BFI count threshold for each beam. The MAC layer may maintain separate BFD system for each beam. The MAC layer of the UE 510 may start the BFI timer in response to receiving the first BFI report from the physical layer of the UE 510, and increase the BFI count every time the MAC layer receives the BFI report while the BFI timer runs. The UE 510 may compare the BFI count to the maximum BFI count threshold to determine the BFD. That is, the UE 510 may determine the BFD based on the BFI count being greater than or equal to the maximum BFI count threshold. The UE 510 may reset the BFI count in response to the expiration of the BFI timer.

For example, the UE 510 may be configured with a first BFI timer and a first maximum BFI count threshold for the first beam 512, and a second BFI timer and a second maximum BFI count threshold for the second beam 514. The MAC layer of the UE 510 may maintain separate BFD system for the first beam 512 and the second beam 514.

In one aspect, the MAC layer of the UE 510 may receive a BFI report associated with the first beam 512 from the physical layer of the UE 510 and start the first BFI timer. The UE 510 may increase the first BFI count every time the MAC layer receives the BFI report associated with the first beam 512 while the first BFI timer runs. The UE 510 may compare the first BFI count to the first maximum BFI count threshold to determine the BFD of the first beam 512. That is, the UE 510 may determine the BFD of the first beam 512 based on the first BFI count being greater than or equal to the first maximum BFI count threshold. The UE 510 may reset the first BFI count in response to the expiration of the first BFI timer.

In another aspect, the MAC layer of the UE 510 may receive BFI report associated with the second beam 514 from the physical layer of the UE 510 and start the second BFI timer. The UE 510 may increase the second BFI count every time the MAC layer receives the BFI report associated with the second beam 514 while the second BFI timer runs. The UE 510 may compare the second BFI count to the second maximum BFI count threshold to determine the BFD of the second beam 514. That is, the UE 510 may determine the BFD of the second beam 514 based on the second BFI count being greater than or equal to the second maximum BFI count threshold. The UE 510 may reset the second BFI count in response to the expiration of the second BFI timer.

In some aspects, multiple parameters related to generating the BFI count or partial BF report may be individually chosen for each beam. For example, the parameters may include at least one of the BFI timer, the threshold BLER value, the maximum BFI count threshold associated with each of the two or more beams, the periodicity for transmitting the partial BF report, the content of the partial BF report, or at least one condition for transmitting the partial BF report, etc.

The base station may configure the multiple parameters related to generating the BFI count or partial BF report and transmit the parameters to the UE. The configuration transmitted from the base station may include at least one of the multiple parameters including the BFI timer, the threshold BLER value, the maximum BFI count threshold associated with each of the two or more beams, the periodicity for transmitting the partial BF report, the content of the partial BF report, or at least one condition for transmitting the partial BF report, etc.

In one aspect, the base station may transmit the configuration including a set of parameters indicating a single value for each parameter. That is, the base station may transmit the configuration including one set of parameters including the value for at least one of the parameters. The configuration may be transmitted by an RRC message, a MAC-CE, and/or DCI.

In another aspect, the base station may transmit the configuration including multiple sets of parameters indicating one or more values for each parameter. That is, the base station may transmit the configuration including one or more sets of parameters including a set of values for at least one of the parameters. The base station may transmit an indication to select or activate one set of parameters among the multiple sets of parameters. For example, the base station may transmit multiple sets of parameters via the RRC signal, select one set of parameters or a subset of multiple sets of parameters among the set of configurations via the MAC-CE, or select one set of parameters among the multiple sets of parameters or the subset of multiple sets of parameters via the DCI. Furthermore, the RRC signal and the MAC-CE may configure multiple sets of parameters for the UE, and the DCI activating the partial BF report may include an activation or reactivation of the one set of parameters among the multiple sets of parameters. Furthermore, the base station may use the MAC-CE or DCI to change the configured parameters.

In some aspects, the UE may be configured to transmit, to the base station, a partial BF report to report the beam failure related information to the base station for each beam.

In one aspect, the UE may periodically report the partial BF report to the base station. The periodic partial BF report may include at least one of the BFI counts of each beam, or channel measurement values of teach beam (e.g., SINR, SNR, RSRP, etc.). The periodic partial BF report may have a reporting periodicity of T. The parameters of the periodic partial BF report may be configured by the base station. The parameters may indicate at least one of the reporting periodicity or the content of the periodic BF report. In one aspect, each beam may be configured with the same or different parameters including the reporting periodicity or the content of the partial BF report. In one aspect, the base station may configure multiple values of the parameter and use the MAC-CE or the DCI to switch between the multiple parameter values.

In another aspect, the UE may aperiodically report the partial BF report to the base station. In one aspect, the aperiodic partial BF report may be triggered based on certain events. That is, the UE may be configured with at least one triggering event to transmit the aperiodic partial BF report to the base station. In one example, the UE may be configured to transmit the aperiodic partial BF report to the base station based on at least one BFI count approaching a threshold value. For example, the UE may transmit the partial BF report to the base station in response to detecting that at least one BFI count of the BFI counts is approaching the maximum BFI count associated with each beam. For example, the UE may detect that the BFI count is greater than (threshold factor)*maximum BFI count, where the threshold factor is 0.6, and determine to transmit the aperiodic partial BF report. In another example, the UE may be configured to transmit the aperiodic partial BF report to the base station based on a sudden change of channel measurement values. For example, the UE may detect that the SINR decreased by a certain amount, e.g., x dB, compared to a previous measurement or an average values of the previous N measurements. In another example, the UE may be configured to transmit the aperiodic partial BF report to the base station based on receiving the instruction from the base station. That is, the base station may aperiodically pull the partial BF report from the UE. For example, the base station may send the MAC-CE or the DCI to instruct the UE to transmit the partial BF report including the current BFI count or a channel measurement for each beam.

The parameters of the aperiodic partial BF report may be configured by the base station. The parameters may indicate at least one of the partial BF report triggering events and associated threshold values or the content of the periodic BF report. In one aspect, each beam may be configured with the same or different parameters. In one aspect, the base station may configure multiple values of the parameter and use the MAC-CE or the DCI to switch between the multiple parameter values.

In one aspect, the base station may activate or deactivate the partial BF report. The base station may activate or deactivate at least one of the periodic or aperiodic partial BF report. The activation or deactivation of the partial BF report may be signaled via the MAC-CE or the DCI.

In another aspect, the UE may request to activate/deactivate the partial BF report. That is, the UE may transmit the request to activate or deactivate the partial BF report. For example, the UE may transmit the request to activate or deactivate at least one of the periodic or aperiodic partial BF report. The request may be transmitted to the base station via the MAC-CE or the UCI. Based on the request to activate/deactivate the partial BF report received from the UE, the base station may determine whether to activate or deactivate the partial BF report. That is, the base station may receive the request to activate/deactivate the partial BF report from the UE and take into consideration the request to activate or deactivate the partial BF report. Particularly, the UE may determine to request the activate or deactivate the partial BF report based on at least one factors including a quality of service (QoS) specification for serving traffic, the configuration of the UE connected mode discontinuous reception (DRX), the power/capacity restraint of the UE, and the UE capacity of handling multiple beams.

In some aspects, in response to receiving the partial BF report from UE, the base station may increase or decrease the number of beams in the BFD-RS set. For example, the UE may originally monitor two beams including the first beam and the second beam in the BFD-RS set, and the base station may determine that the first beam has a bad network condition based on the partial BF report regarding the first beam received from the UE.

In one aspect, the base station may determine to add another beam, e.g., the third beam, into the BFD-RS set and signal the UE to monitor the first beam, the second beam, and the third beam to receive the BFD-RS for the BFD/BFR purposes.

In another aspect, the base station may perform beam switching based on the partial BF report received from the UE, and the base station may switch the beam in the BFD-RS set. For example, the UE may originally monitor two beams in the BFD-RS set, and the base station may determine that the beam condition of the first beam is bad or poor based the partial BF report associated with the first beam from UE, the base station may deactivate the first beam and switch to a third beam. Accordingly, the UE may monitor the second beam and the third beam for the BFD/BFR purpose.

In one aspect, the beam switching may be done via the MAC-CE or the DCI. In another aspect, the UE may request to modify current BFD-RS set in the partial BF report. In another aspect, the UE may request to increase or decrease the number of beams in the BFD-RS set. In another aspect, the UE may be request to switch beam in the BFD-RS set. The request may be transmitted to the base station via at least one of the MAC-CE or the UCI.

Figure 6:
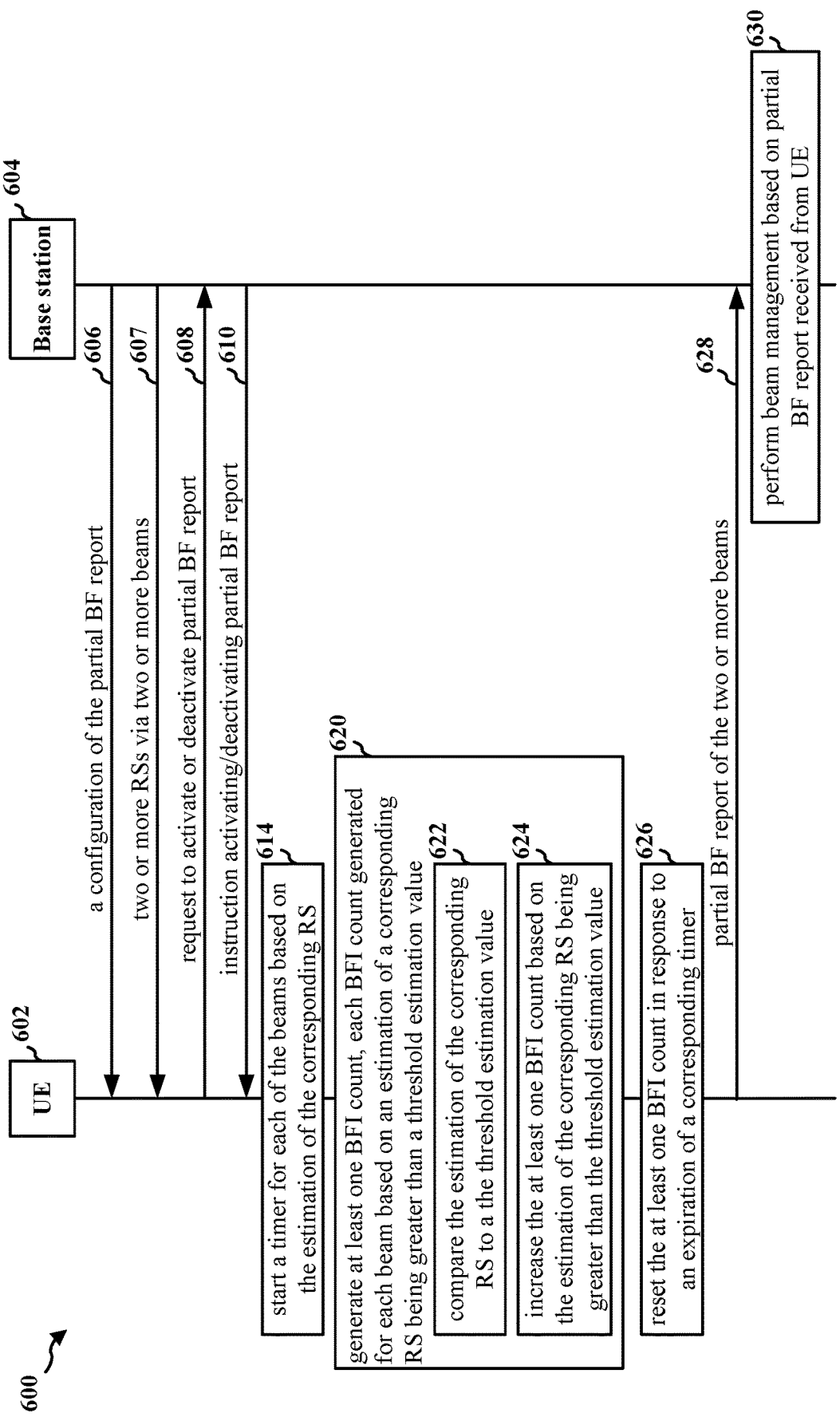
FIG. 6 is a call-flow diagram of a method of wireless communication.

FIG. 6 is a call-flow diagram 600 of a method of wireless communication. The UE 602 may perform the beam failure procedure per beam of the multiple beams and transmit, to the base station 604, a partial BF report. The base station 604 may transmit, to the UE 602, a configuration of the partial BF report, and the UE 602 may generate and transmit the partial BF report for the base station 604 to perform the beam management.

At 606, the base station 604 may transmit, to the UE 602, the configuration of the partial BF report. The UE 602 may receive, from the base station 604, the configuration of the partial BF report. Here, the configuration including parameters may include at least one of a timer, the threshold estimation value, a maximum BFI count associated with each of the two or more beams, a periodicity for transmitting the partial BF report, a content of the partial BF report, or at least one condition for transmitting the partial BF report.

The configuration may be received via at least one of an RRC message, a MAC-CE, or DCI. The configuration may include multiple sets of parameters received via an RRC message, and the UE 602 may receive an instruction activating one set of parameters among the multiple sets of parameters, the partial BF report being transmitted based on the one set of parameters, where the instruction is received via at least one of a MAC-CE or DCI.

At 607, the base station 604 may transmit, to the UE 602, two or more RSs via two or more beams, each of the two or more RSs being transmitted via each of the two or more beams. The UE 602 may receive, from the base station 604, two or more RSs via two or more beams, each of the two or more RSs being received via each of the two or more beams.

At 608, the UE 602 may transmit, to the base station 604, a request to activate or deactivate the partial BF report, where the request is transmitted via at least one of a MAC-CE or uplink control information (UCI). The base station 604 may receive, from the UE 602, the request to activate or deactivate the partial BF report, where the configuration may be determined based at least a part on the request received from the UE 602. That is, the base station 604 may receive the request to activate/deactivate the partial BF report from the UE 602 and take into consideration the request to activate or deactivate the partial BF report. Particularly, the UE 602 may determine to request the activate or deactivate the partial BF report based on at least one factors including a QoS specification for serving traffic, the configuration of the UE 602 connected mode DRX, the power/capacity restraint of the UE 602, and the UE 602 capacity of handling multiple beams.

At 610, the base station 604 may transmit, to the UE 602, an instruction activating the partial BF report. The UE 602 may receive, from the base station 604, the instruction activating the partial BF report. The partial BF report may be transmitted to the base station 604 based on the instruction received from the base station 604. The activation or deactivation of the partial BF report may be signaled via the MAC-CE or the DCI.

At 614, the UE 602 may start a timer for each of the two or more beams based on the estimation of the corresponding RS. Here, the timer may be a BFI timer. The timer may be configured the same or different for each beam. Upon receiving a BFI report from the physical layer of the UE 602, the MAC layer of the UE 602 may start the timer.

At 620, the UE 602 may generate at least one BFI count, each of the at least one BFI count generated for each of the two or more beams based on an estimation of a corresponding RS being greater than a threshold estimation value. Here, the estimation of the corresponding RS may include a BLER of the corresponding RS, and the threshold estimation value may be a threshold BLER value. Accordingly, if the channel condition is maintained at a good condition, e.g., the estimated BLER is maintained to be less than the threshold BLER value, the physical layer of the UE 602 may not generate the BFI count. The UE 602 may compare the BFI count to the maximum BFI count threshold to determine the BFD. That is, the UE 602 may determine the BFD based on the BFI count being greater than or equal to the maximum BFI count threshold.

The 620 may include 622 and 624. At 622, the UE 602 may compare the estimation of the corresponding RS to the threshold estimation value, and at 624, the UE 602 may increase the at least one BFI count based on the estimation of the corresponding RS being greater than the threshold estimation value. Here, the estimation of the corresponding RS may be the BLER of the corresponding RS, and the threshold estimation value may be the threshold BLER value. The physical layer of the UE 602 may transmit the BFI report to the MAC layer based on the BLER of the corresponding RS being greater than the threshold BLER value, and the MAC layer of the UE 602 may increase the BFI count every time the MAC layer receives the BFI report while the BFI timer runs.

At 626, the UE 602 may reset the at least one BFI count in response to an expiration of a corresponding timer. That is, the UE 602 may reset the BFI count in response to the expiration of the timer.

At 628, the UE 602 may transmit, to the base station 604, a partial BF report of the two or more beams, the partial BF report including the at least one BFI count. The base station 604 may receive, from the UE 602, the partial BF report of the two or more beams transmitted to the UE 602, the partial BF report including at least one BFI count, each of the at least one BFI count generated for each of the two or more beams based on an estimation of a corresponding RS at the UE 602 being greater than a threshold estimation value.

In one aspect, the partial BF report may be periodically transmitted to the base station 604, the partial BF report further including at least one measurement of the two or more beams. The periodic partial BF report may include at least one of the BFI counts of each beam, or channel measurement values of teach beam (e.g., SINR, SNR, RSRP, etc.).

In another aspect, the partial BF report may be aperiodically transmitted to the base station 604 based on at least one condition. The at least one condition may include the at least one BFI count being greater than or equal to a threshold BFI count, a change of at least one measurement of the two or more beams being greater than or equal to a threshold measurement value, or an instruction from the base station 604 to transmit the partial BF report. In one example, the UE 602 may be configured to transmit the aperiodic partial BF report to the base station 604 based on at least one BFI count approaching a threshold value (e.g., the BFI count being greater than (threshold factor)*maximum BFI count). In another example, the UE 602 may be configured to transmit the aperiodic partial BF report to the base station 604 based on a sudden change of channel measurement values. In another example, the UE 602 may be configured to transmit the aperiodic partial BF report to the base station 604 based on receiving the instruction from the base station 604.

At 630, the base station 604 may perform beam management based on the partial BF report received from the UE 602. That is, in response to receiving the partial BF report from UE 602, the base station 604 may increase or decrease the number of beams in the BFD-RS set. For example, the UE 602 may originally monitor two beams including the first beam and the second beam in the BFD-RS set, and the base station 604 may determine that first beam has a bad network condition based on the partial BF report regarding the first beam received from the UE 602. In one aspect, the base station 604 may determine to add another beam into the BFD-RS set, and in another aspect, the base station 604 may perform beam switching based on the partial BF report received from the UE 602.

Figure 7:
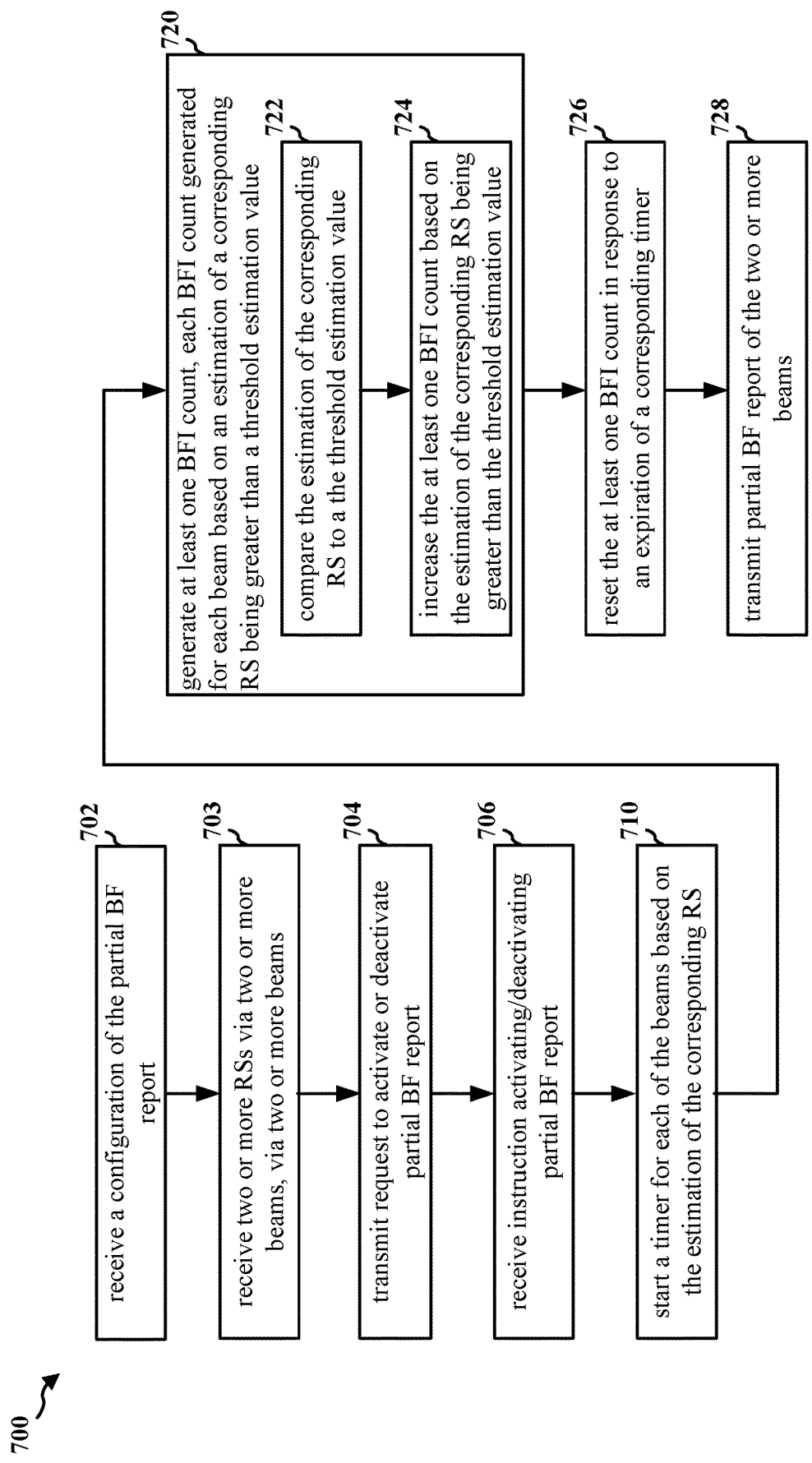
FIG. 7 is a flowchart of a method of wireless communication.

FIG. 7 is a flowchart 700 of a method of wireless communication. The method may be performed by a UE (e.g., the UE 104/602; the apparatus 1102). The UE may perform the beam failure procedure per beam of the multiple beams and transmit, to a base station, a partial BF report. The UE may receive, from the base station, a configuration of the partial BF report, and the UE may generate and transmit the partial BF report for the base station to perform the beam management.

At 702, the UE may receive, from the base station, the configuration of the partial BF report. Here, the configuration including parameters may include at least one of a timer, the threshold estimation value, a maximum BFI count associated with each of the two or more beams, a periodicity for transmitting the partial BF report, a content of the partial BF report, or at least one condition for transmitting the partial BF report. For example, at 606, the UE 602 may receive, from the base station 604, the configuration of the partial BF report. Furthermore, 702 may be performed by a partial BF report configuration component 1140.

The configuration may be received via at least one of an RRC message, a MAC-CE, or DCI. The configuration may include multiple sets of parameters received via an RRC message, and the UE 602 may receive an instruction activating one set of parameters among the multiple sets of parameters, the partial BF report being transmitted based on the one set of parameters, where the instruction is received via at least one of a MAC-CE or DCI.

At 703, the UE may receive, from the base station, two or more RSs via two or more beams, each of the two or more RSs being received via each of the two or more beams. For example, at 607, the UE 602 may receive, from the base station 604, two or more RSs via two or more beams, each of the two or more RSs being received via each of the two or more beams. Furthermore, 703 may be performed by an RS estimation component 1144.

At 704, the UE may transmit, to the base station, a request to activate or deactivate the partial BF report, where the request is transmitted via at least one of a MAC-CE or UCI. That is, the base station may receive the request to activate/deactivate the partial BF report from the UE and take into consideration the request to activate or deactivate the partial BF report. Particularly, the UE may determine to request the activate or deactivate the partial BF report based on at least one factors including a QoS specification for serving traffic, the configuration of the UE connected mode DRX, the power/capacity restraint of the UE, and the UE capacity of handling multiple beams. For example, at 608, the UE 602 may transmit, to the base station 604, a request to activate or deactivate the partial BF report, where the request is transmitted via at least one of a MAC-CE or uplink control information (UCI). Furthermore, 704 may be performed by a partial BF report activation component 1142.

At 706, the UE may receive, from the base station, the instruction activating the partial BF report. The partial BF report may be transmitted to the base station based on the instruction received from the base station. The activation or deactivation of the partial BF report may be signaled via the MAC-CE or the DCI. For example, at 610, the UE 602 may receive, from the base station 604, the instruction activating the partial BF report. Furthermore, 706 may be performed by the partial BF report activation component 1142.

At 710, the UE may start a timer for each of the two or more beams based on the estimation of the corresponding RS. Here, the timer may be a BFI timer. The timer may be configured the same or different for each beam. Upon receiving a BFI report from the physical layer of the UE, the MAC layer of the UE may start the timer. For example, at 614, the UE 602 may start a timer for each of the two or more beams based on the estimation of the corresponding RS. Furthermore, 710 may be performed by a BFI timer component 1146.

At 720, the UE may generate at least one BFI count, each of the at least one BFI count generated for each of the two or more beams based on an estimation of a corresponding RS being greater than a threshold estimation value. Here, the estimation of the corresponding RS may include a BLER of the corresponding RS, and the threshold estimation value may be a threshold BLER value. Accordingly, if the channel condition is maintained at a good condition, e.g., the estimated BLER is maintained to be less than the threshold BLER value, the physical layer of the UE may not generate the BFI count. The UE may compare the BFI count to the maximum BFI count threshold to determine the BFD. That is, the UE may determine the BFD based on the BFI count being greater than or equal to the maximum BFI count threshold. The 720 may include 722 and 724. At 622, the UE may compare the estimation of the corresponding RS to the threshold estimation value, and at 624, the UE may increase the at least one BFI count based on the estimation of the corresponding RS being greater than the threshold estimation value. Here, the estimation of the corresponding RS may be the BLER of the corresponding RS, and the threshold estimation value may be the threshold BLER value. The physical layer of the UE may transmit the BFI report to the MAC layer based on the BLER of the corresponding RS being greater than the threshold BLER value, and the MAC layer of the UE may increase the BFI count every time the MAC layer receives the BFI report while the BFI timer runs. For example, at 620, the UE 602 may generate at least one BFI count, each of the at least one BFI count generated for each of the two or more beams based on an estimation of a corresponding RS being greater than a threshold estimation value. At 622, the UE 602 may compare the estimation of the corresponding RS to the threshold estimation value, and at 624, the UE 602 may increase the at least one BFI count based on the estimation of the corresponding RS being greater than the threshold estimation value. Furthermore, 720, 722, and 724 may be performed by a BFI count component 1148.

At 726, the UE may reset the at least one BFI count in response to an expiration of a corresponding timer. That is, the UE may reset the BFI count in response to the expiration of the timer. For example, at 626, the UE 602 may reset the at least one BFI count in response to an expiration of a corresponding timer. Furthermore, 726 may be performed by the BFI timer component 1146 and the BFI count component 1148.

At 728, the UE may transmit, to the base station, a partial BF report of the two or more beams, the partial BF report including the at least one BFI count. For example, at 628, the UE 602 may transmit, to the base station 604, a partial BF report of the two or more beams, the partial BF report including the at least one BFI count. Furthermore, 728 may be performed by a partial BF report component 1150.

In one aspect, the partial BF report may be periodically transmitted to the base station, the partial BF report further including at least one measurement of the two or more beams. The periodic partial BF report may include at least one of the BFI counts of each beam, or channel measurement values of teach beam (e.g., SINR, SNR, RSRP, etc.).

In another aspect, the partial BF report may be aperiodically transmitted to the base station based on at least one condition. The at least one condition may include the at least one BFI count being greater than or equal to a threshold BFI count, a change of at least one measurement of the two or more beams being greater than or equal to a threshold measurement value, or an instruction from the base station to transmit the partial BF report. In one example, the UE may be configured to transmit the aperiodic partial BF report to the base station based on at least one BFI count approaching a threshold value (e.g., the BFI count being greater than (threshold factor)*maximum BFI count). In another example, the UE may be configured to transmit the aperiodic partial BF report to the base station based on a sudden change of channel measurement values. In another example, the UE may be configured to transmit the aperiodic partial BF report to the base station based on receiving the instruction from the base station.

Figure 8:
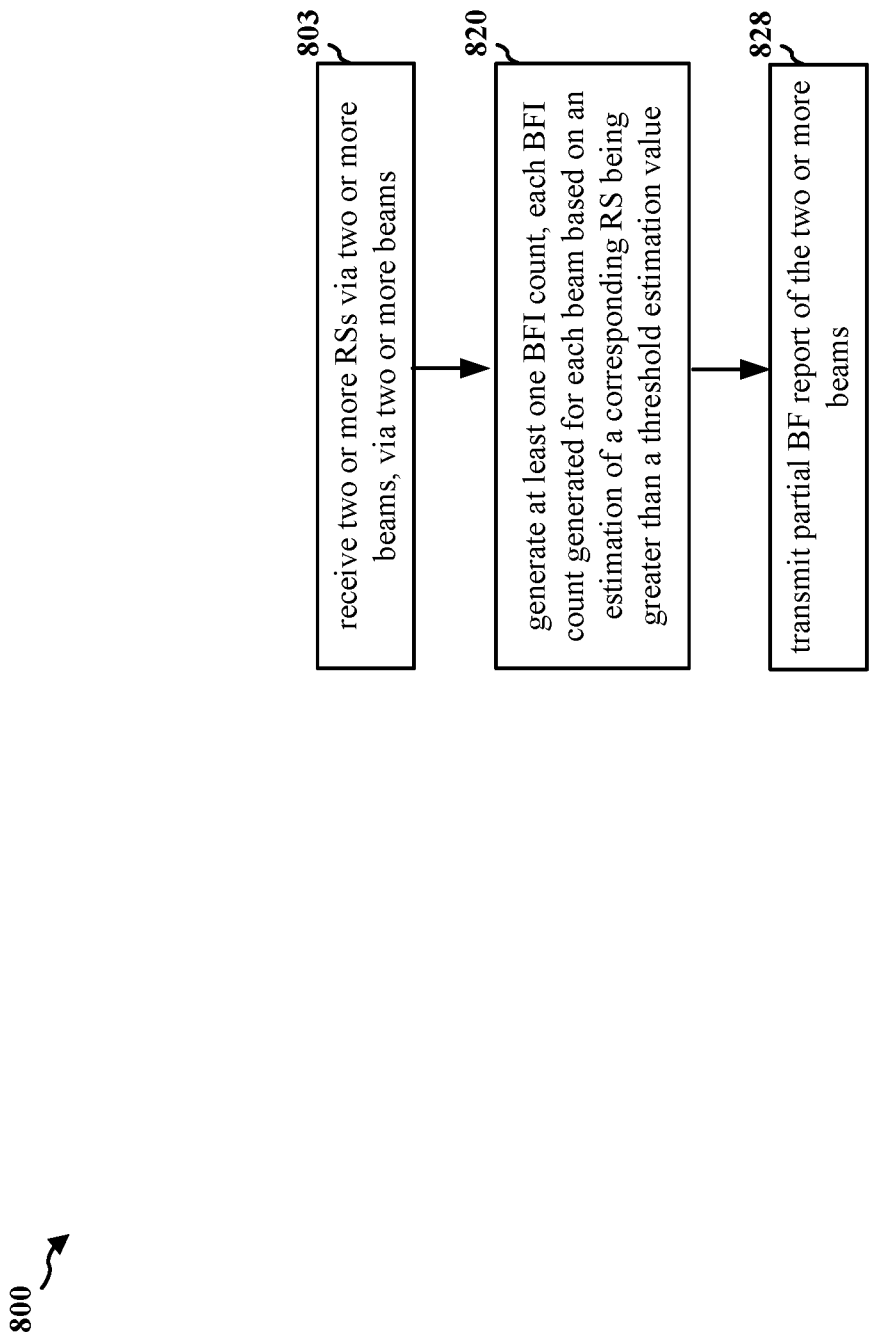
FIG. 8 is a flowchart of a method of wireless communication.

FIG. 8 is a flowchart 800 of a method of wireless communication. The method may be performed by a UE (e.g., the UE 104/602; the apparatus 1102). The UE may perform the beam failure procedure per beam of the multiple beams and transmit, to a base station, a partial BF report. The UE may receive, from the base station, a configuration of the partial BF report, and the UE may generate and transmit the partial BF report for the base station to perform the beam management.

At 803, the UE may receive, from the base station, two or more RSs via two or more beams, each of the two or more RSs being received via each of the two or more beams. For example, at 607, the UE 602 may receive, from the base station 604, two or more RSs via two or more beams, each of the two or more RSs being received via each of the two or more beams. Furthermore, 803 may be performed by an RS estimation component 1144.

At 820, the UE may generate at least one BFI count, each of the at least one BFI count generated for each of the two or more beams based on an estimation of a corresponding RS being greater than a threshold estimation value. Here, the estimation of the corresponding RS may include a BLER of the corresponding RS, and the threshold estimation value may be a threshold BLER value. The UE may compare the BFI count to the maximum BFI count threshold to determine the BFD. That is, the UE may determine the BFD based on the BFI count being greater than or equal to the maximum BFI count threshold. For example, at 620, the UE 602 may generate at least one BFI count, each of the at least one BFI count generated for each of the two or more beams based on an estimation of a corresponding RS being greater than a threshold estimation value. Furthermore, 820 may be performed by a BFI count component 1148.

At 828, the UE may transmit, to the base station, a partial BF report of the two or more beams, the partial BF report including the at least one BFI count. For example, at 628, the UE 602 may transmit, to the base station 604, a partial BF report of the two or more beams, the partial BF report including the at least one BFI count. Furthermore, 828 may be performed by a partial BF report component 1150.

In one aspect, the partial BF report may be periodically transmitted to the base station, the partial BF report further including at least one measurement of the two or more beams. The periodic partial BF report may include at least one of the BFI counts of each beam, or channel measurement values of teach beam (e.g., SINR, SNR, RSRP, etc.).

In another aspect, the partial BF report may be aperiodically transmitted to the base station based on at least one condition. The at least one condition may include the at least one BFI count being greater than or equal to a threshold BFI count, a change of at least one measurement of the two or more beams being greater than or equal to a threshold measurement value, or an instruction from the base station to transmit the partial BF report. In one example, the UE may be configured to transmit the aperiodic partial BF report to the base station based on at least one BFI count approaching a threshold value (e.g., the BFI count being greater than (threshold factor)*maximum BFI count). In another example, the UE may be configured to transmit the aperiodic partial BF report to the base station based on a sudden change of channel measurement values. In another example, the UE may be configured to transmit the aperiodic partial BF report to the base station based on receiving the instruction from the base station.

Figure 9:
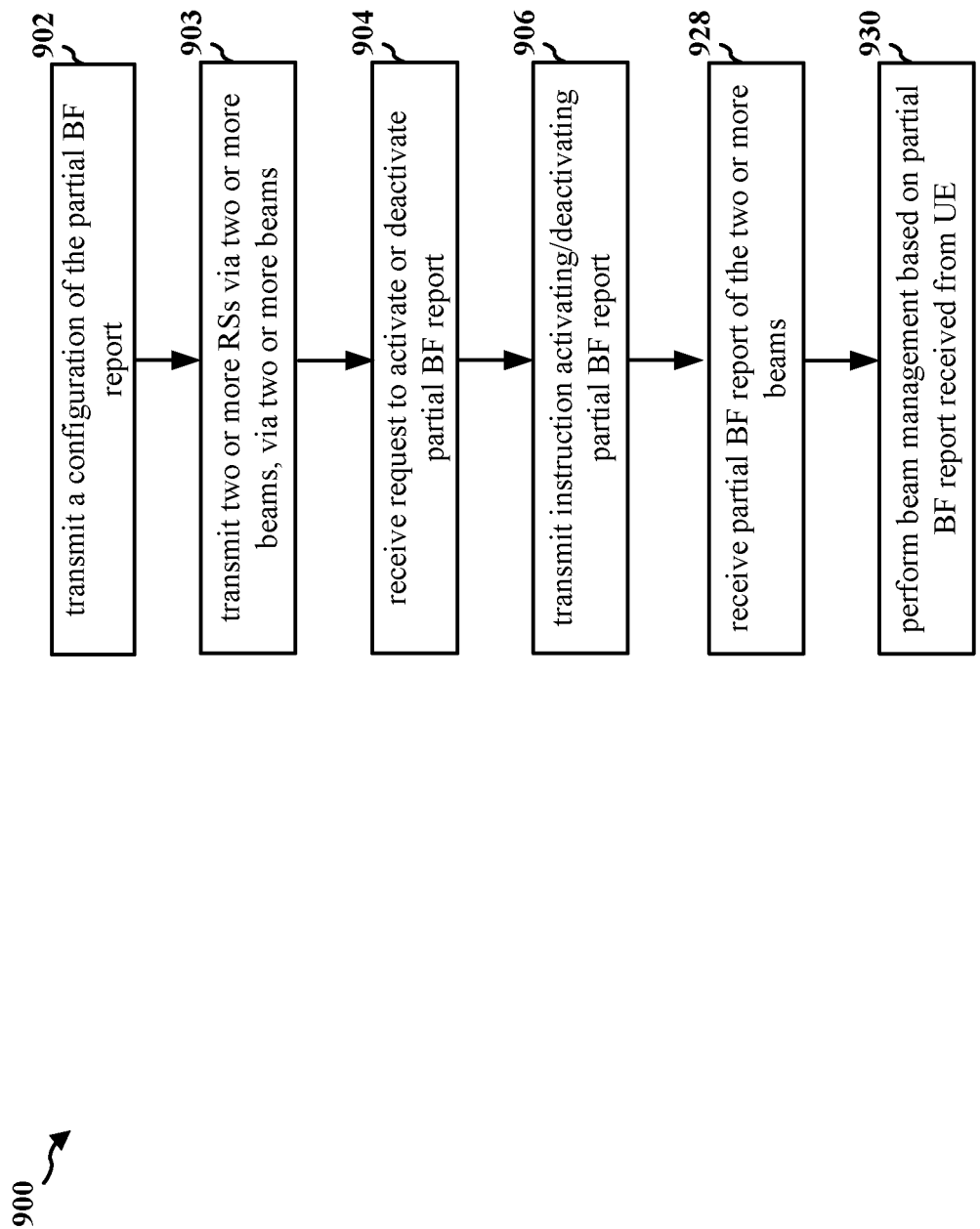
FIG. 9 is a flowchart of a method of wireless communication.

FIG. 9 is a flowchart 900 of a method of wireless communication. The method may be performed by a base station (e.g., the base station 102/180/604; the apparatus 1202). The base station may transmit, to the UE, a configuration of a partial BF report, and the UE may generate and transmit the partial BF report to the base station for the base station to perform the beam management.

At 902, the base station may transmit, to the UE, the configuration of the partial BF report. Here, the configuration including parameters may include at least one of a timer, the threshold estimation value, a maximum BFI count associated with each of the two or more beams, a periodicity for transmitting the partial BF report, a content of the partial BF report, or at least one condition for transmitting the partial BF report. For example, at 606, the base station 604 may transmit, to the UE 602, the configuration of the partial BF report. Furthermore, 902 may be performed by a partial BF report configuration component 1240.

The configuration may be received via at least one of an RRC message, a MAC-CE, or DCI. The configuration may include multiple sets of parameters received via an RRC message, and the UE 602 may receive an instruction activating one set of parameters among the multiple sets of parameters, the partial BF report being transmitted based on the one set of parameters, where the instruction is received via at least one of a MAC-CE or DCI.

At 903, the base station may transmit, to the UE, two or more RSs via two or more beams, each of the two or more RSs being transmitted via each of the two or more beams. For example, at 607, the base station 604 may transmit, to the UE 602, two or more RSs via two or more beams, each of the two or more RSs being transmitted via each of the two or more beams. Furthermore, 903 may be performed by an RS estimation component 1244.

At 904, the base station may receive, from the UE, the request to activate or deactivate the partial BF report, where the configuration may be determined based at least a part on the request received from the UE. That is, the base station may receive the request to activate/deactivate the partial BF report from the UE and take into consideration the request to activate or deactivate the partial BF report. Particularly, the UE may determine to request the activate or deactivate the partial BF report based on at least one factors including a QoS specification for serving traffic, the configuration of the UE connected mode DRX, the power/capacity restraint of the UE, and the UE capacity of handling multiple beams. For example, at 608, the base station 604 may receive, from the UE 602, the request to activate or deactivate the partial BF report, where the configuration may be determined based at least a part on the request received from the UE 602. Furthermore, 904 may be performed by a partial BF report activation component 1242.

At 906, the base station may transmit, to the UE, an instruction activating the partial BF report. The partial BF report may be transmitted to the base station based on the instruction received from the base station. The activation or deactivation of the partial BF report may be signaled via the MAC-CE or the DCI. For example, at 610, the base station 604 may transmit, to the UE 602, an instruction activating the partial BF report. Furthermore, 906 may be performed by the partial BF report activation component 1242.

At 928, the base station may receive, from the UE, the partial BF report of the two or more beams transmitted to the UE, the partial BF report including at least one BFI count, each of the at least one BFI count generated for each of the two or more beams based on an estimation of a corresponding RS at the UE being greater than a threshold estimation value. For example, at 628, the base station 604 may receive, from the UE 602, the partial BF report of the two or more beams transmitted to the UE 602, the partial BF report including at least one BFI count, each of the at least one BFI count generated for each of the two or more beams based on an estimation of a corresponding RS at the UE 602 being greater than a threshold estimation value. Furthermore, 928 may be performed by a partial BF report component 1250.

In one aspect, the partial BF report may be periodically transmitted to the base station, the partial BF report further including at least one measurement of the two or more beams. The periodic partial BF report may include at least one of the BFI counts of each beam, or channel measurement values of teach beam (e.g., SINR, SNR, RSRP, etc.).

In another aspect, the partial BF report may be aperiodically transmitted to the base station based on at least one condition. The at least one condition may include the at least one BFI count being greater than or equal to a threshold BFI count, a change of at least one measurement of the two or more beams being greater than or equal to a threshold measurement value, or an instruction from the base station to transmit the partial BF report. In one example, the UE may be configured to transmit the aperiodic partial BF report to the base station based on at least one BFI count approaching a threshold value (e.g., the BFI count being greater than (threshold factor)*maximum BFI count). In another example, the UE may be configured to transmit the aperiodic partial BF report to the base station based on a sudden change of channel measurement values. In another example, the UE may be configured to transmit the aperiodic partial BF report to the base station based on receiving the instruction from the base station.

At 930, the base station may perform beam management based on the partial BF report received from the UE. That is, in response to receiving the partial BF report from UE, the base station may increase or decrease the number of beams in the BFD-RS set. For example, the UE may originally monitor two beams including the first beam and the second beam in the BFD-RS set, and the base station may determine that first beam has a bad network condition based on the partial BF report regarding the first beam received from the UE. In one aspect, the base station may determine to add another beam into the BFD-RS set, and in another aspect, the base station may perform beam switching based on the partial BF report received from the UE. For example, at 630, the base station 604 may perform beam management based on the partial BF report received from the UE 602. Furthermore, 930 may be performed by a beam management component 1252.

Figure 10:
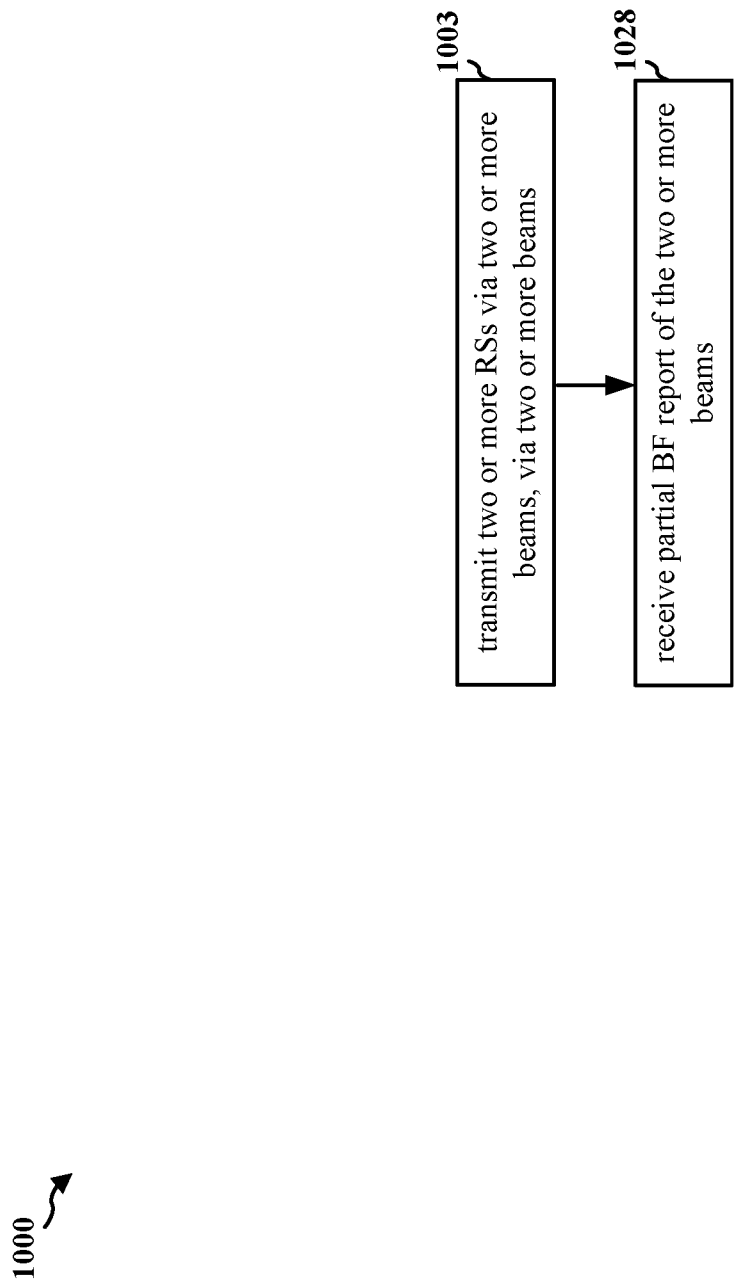
FIG. 10 is a flowchart of a method of wireless communication.

FIG. 10 is a flowchart 1000 of a method of wireless communication. The method may be performed by a base station (e.g., the base station 102/180/604; the apparatus 1202). The base station may transmit, to the UE, a configuration of a partial BF report, and the UE may generate and transmit the partial BF report to the base station for the base station to perform the beam management.

At 1003, the base station may transmit, to the UE, two or more RSs via two or more beams, each of the two or more RSs being transmitted via each of the two or more beams. For example, at 607, the base station 604 may transmit, to the UE 602, two or more RSs via two or more beams, each of the two or more RSs being transmitted via each of the two or more beams. Furthermore, 1003 may be performed by an RS estimation component 1244.

At 1028, the base station may receive, from the UE, the partial BF report of the two or more beams transmitted to the UE, the partial BF report including at least one BFI count, each of the at least one BFI count generated for each of the two or more beams based on an estimation of a corresponding RS at the UE being greater than a threshold estimation value. For example, at 628, the base station 604 may receive, from the UE 602, the partial BF report of the two or more beams transmitted to the UE 602, the partial BF report including at least one BFI count, each of the at least one BFI count generated for each of the two or more beams based on an estimation of a corresponding RS at the UE 602 being greater than a threshold estimation value. Furthermore, 1028 may be performed by a partial BF report component 1250.

In one aspect, the partial BF report may be periodically transmitted to the base station, the partial BF report further including at least one measurement of the two or more beams. The periodic partial BF report may include at least one of the BFI counts of each beam, or channel measurement values of teach beam (e.g., SINR, SNR, RSRP, etc.).

In another aspect, the partial BF report may be aperiodically transmitted to the base station based on at least one condition. The at least one condition may include the at least one BFI count being greater than or equal to a threshold BFI count, a change of at least one measurement of the two or more beams being greater than or equal to a threshold measurement value, or an instruction from the base station to transmit the partial BF report. In one example, the UE may be configured to transmit the aperiodic partial BF report to the base station based on at least one BFI count approaching a threshold value (e.g., the BFI count being greater than (threshold factor)*maximum BFI count). In another example, the UE may be configured to transmit the aperiodic partial BF report to the base station based on a sudden change of channel measurement values. In another example, the UE may be configured to transmit the aperiodic partial BF report to the base station based on receiving the instruction from the base station.

Figure 11:
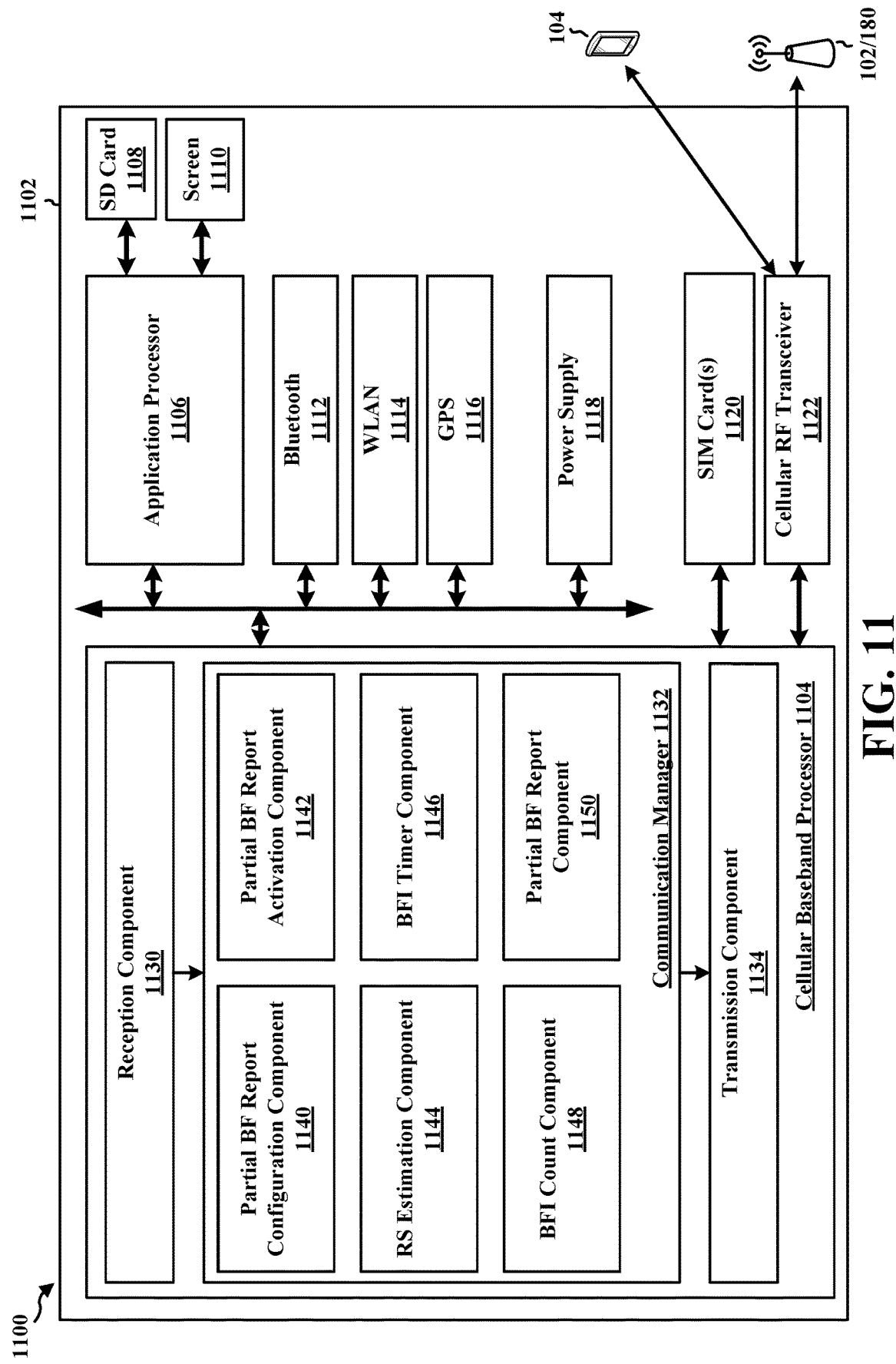
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a partial BF report configuration component 1140 that is configured to receive the configuration of the partial BF report, e.g., as described in connection with 702. The communication manager 1132 further includes a partial BF report activation component 1142 that is configured to transmit a request to activate or deactivate the partial BF report, and receive the instruction activating the partial BF report, e.g., as described in connection with 704 and 706. The communication manager 1132 includes an RS estimation component 1144 that is configured to receive two or more RSs via two or more beams, e.g., as described in connection with 703 and 803. The communication manager 1132 includes a BFI timer component 1146 that is configured to start a timer for each of the two or more beams based on the estimation of the corresponding RS, and reset the at least one BFI count in response to an expiration of a corresponding timer, e.g., as described in connection with 710 and 726. The communication manager 1132 further includes a BFI count component 1148 that is configured to generate at least one BFI count, each of the at least one BFI count generated for each of the two or more beams based on an estimation of a corresponding RS being greater than a threshold estimation value, compare the estimation of the corresponding RS to the threshold estimation value, increase the at least one BFI count based on the estimation of the corresponding RS being greater than the threshold estimation value, and reset the at least one BFI count in response to an expiration of a corresponding timer, e.g., as described in connection with 720, 722, 724, 726, and 820. The communication manager 1132 includes a partial BF report component 1150 that is configured to transmit a partial BF report of the two or more beams, the partial BF report including the at least one BFI count, e.g., as described in connection with 728, and 828.

The apparatus may include additional components that perform each of the blocks of the algorithm in the flowcharts of FIGS. 6, 7, and 8. As such, each block in the flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, two or more RSs via two or more beams, each of the two or more RSs being received via each of the two or more beams, means for generating at least one BFI count, each of the at least one BFI count generated for each of the two or more beams based on an estimation of a corresponding RS being greater than a threshold estimation value, and means for transmitting, to the base station, a partial beam failure report of the two or more beams, the partial beam failure report including the at least one BFI count. The apparatus 1102 includes means for comparing the estimation of the corresponding RS to the threshold estimation value, and means for increasing the at least one BFI count based on the estimation of the corresponding RS being greater than the threshold estimation value. The apparatus 1102 includes means for starting a timer for each of the two or more beams based on the estimation of the corresponding RS, and means for resetting the at least one BFI count in response to an expiration of a corresponding timer. The apparatus 1102 includes means for receiving a configuration of the partial beam failure report, the configuration including parameters, means for receiving an instruction activating one set of parameters among the multiple sets of parameters, the partial beam failure report being transmitted based on the one set of parameters, and means for receiving, from the base station, an instruction activating the partial beam failure report, and the partial beam failure report is transmitted to the base station based on the instruction received from the base station. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
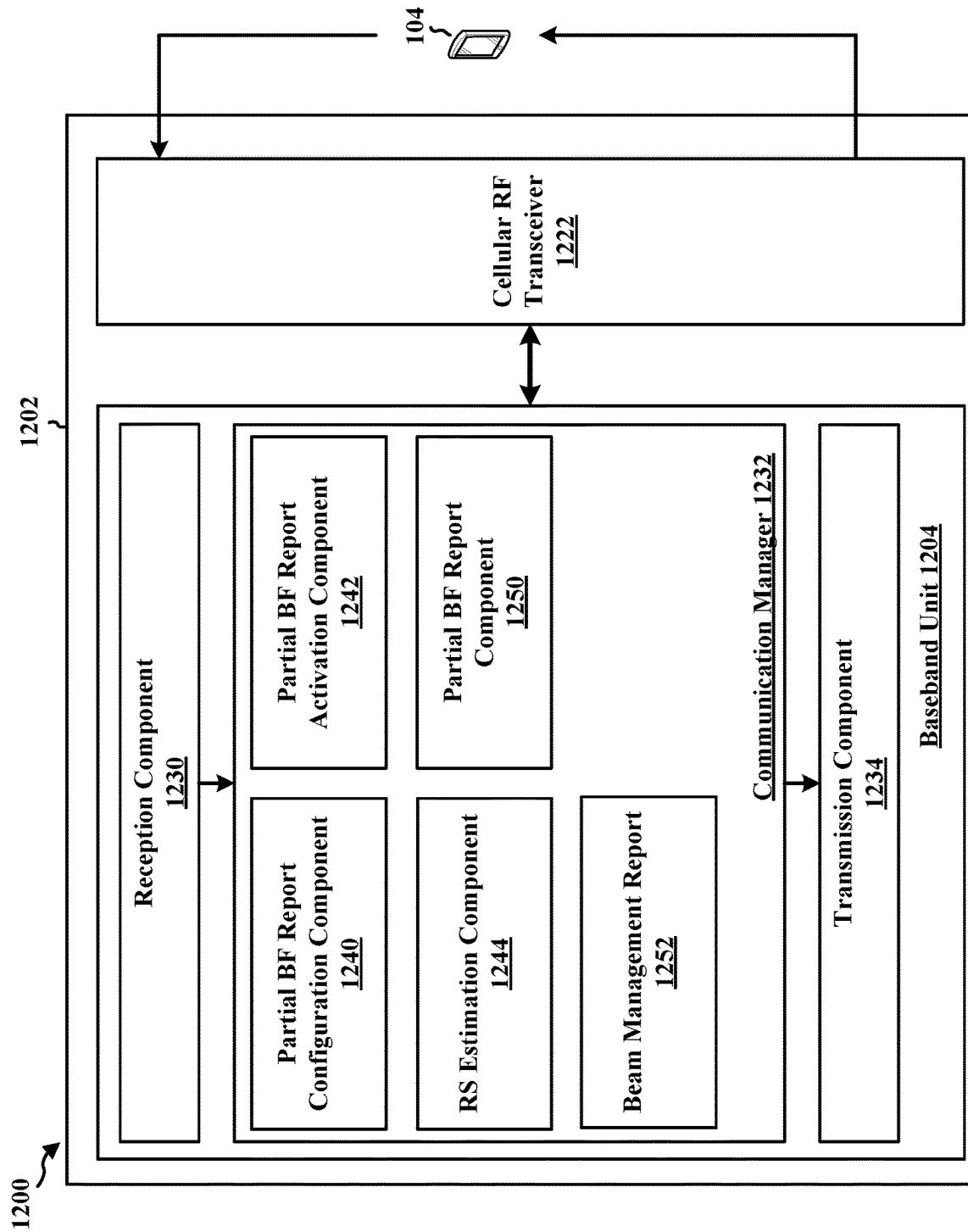
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a partial BF report configuration component 1240 that is configured to transmit the configuration of the partial BF report, e.g., as described in connection with 902. The communication manager 1232 further includes a partial BF report activation component 1242 that is configured to receive the request to activate or deactivate the partial BF report, and transmit an instruction activating the partial BF report, e.g., as described in connection with 904 and 906. The communication manager 1232 includes an RS estimation component 1244 that is configured to transmit two or more RSs via two or more beams, each of the two or more RSs being transmitted via each of the two or more beams, e.g., as described in connection with 903 and 1003. The communication manager 1232 includes a partial BF report component 1250 that is configured to receive the partial BF report of the two or more beams transmitted to the UE, e.g., as described in connection with 928 and 1028. The communication manager 1232 further includes a beam management component 1252 that is configured to perform beam management based on the partial BF report received from the UE, e.g., as described in connection with 930.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, to a UE, two or more RSs via two or more beams, each of the two or more RSs being transmitted via each of the two or more beams, and means for receiving, from the UE, a partial beam failure report of the two or more beams transmitted to the UE, the partial beam failure report including at least one BFI count, each of the at least one BFI count generated for each of the two or more beams based on an estimation of a corresponding RS at the UE being greater than a threshold estimation value. The apparatus 1202 includes means for transmitting a configuration of the partial beam failure report, the configuration including parameters, means for transmitting an instruction activating one set of parameters among the multiple sets of parameters, the partial beam failure report being received based on the one set of parameters, means for receiving, from the UE, a request to activate or deactivate the partial beam failure report, and means for transmitting an instruction activating the partial beam failure report, and the partial beam failure report is received from the UE based on the instruction. The apparatus 1202 includes means for performing beam management based on the partial beam failure report received from the UE. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

In a multiple beam system including a base station and a UE, the UE may perform beam failure procedure per beam of the multiple beams and transmit, to the base station, a partial BF report. The base station may transmit, to the UE, a configuration of the partial BF report, and the UE may generate and transmit the partial BF report for the base station to perform the beam management. The parameters of the aperiodic partial BF report may be configured with the same or different parameters for each beam. The partial BF report may include at least one of a current BFI count or a channel measurement for each beam. The partial BF report may be transmitted periodically or aperiodically.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, two or more RSs via two or more beams, each of the two or more RSs being received via each of the two or more beams, generate at least one BFI count, each of the at least one BFI count generated for each of the two or more beams based on an estimation of a corresponding RS being greater than a threshold estimation value, and transmit, to the base station, a partial beam failure report of the two or more beams, the partial beam failure report including the at least one BFI count.

Aspect 2 is the apparatus of aspect 1, further including a transceiver coupled to the at least one processor, where the estimation of the corresponding RS includes a BLER of the corresponding RS.

Aspect 3 is the apparatus of any of aspects 1 and 2, where, to generate the at least one BFI count, the at least one processor and the memory are configured to compare the estimation of the corresponding RS to the threshold estimation value, and increase the at least one BFI count based on the estimation of the corresponding RS being greater than the threshold estimation value.

Aspect 4 is the apparatus of any of aspects 1 to 3, where the at least one processor and the memory are further configured to start a timer for each of the two or more beams based on the estimation of the corresponding RS, and reset the at least one BFI count in response to an expiration of a corresponding timer.

Aspect 5 is the apparatus of any of aspects 1 to 4, where the partial beam failure report is periodically transmitted to the base station, the partial beam failure report further including at least one measurement of the two or more beams.

Aspect 6 is the apparatus of any of aspects 1 to 5, where the partial beam failure report is aperiodically transmitted to the base station based on at least one condition including the at least one BFI count being greater than or equal to a threshold BFI count, a change of at least one measurement of the two or more beams being greater than or equal to a threshold measurement value, or an instruction from the base station to transmit the partial beam failure report.

Aspect 7 is the apparatus of any of aspects 1 to 6, where the at least one processor and the memory are further configured to receive a configuration of the partial beam failure report, the configuration including parameters including at least one of a timer, the threshold estimation value, a maximum BFI count associated with each of the two or more beams, a periodicity for transmitting the partial beam failure report, a content of the partial beam failure report, or at least one condition for transmitting the partial beam failure report.

Aspect 8 is the apparatus of aspect 7, where the configuration is received via at least one of an RRC message, a MAC-CE, or DCI.

Aspect 9 is the apparatus of any of aspects 7 and 8, where the configuration includes multiple sets of parameters received via an RRC message, and the at least one processor and the memory are further configured to receive an instruction activating one set of parameters among the multiple sets of parameters, the partial beam failure report being transmitted based on the one set of parameters, where the instruction is received via at least one of a MAC-CE or DCI.

Aspect 10 is the apparatus of any of aspects 1 to 9, where the at least one processor and the memory are further configured to receive, from the base station, an instruction activating the partial beam failure report, and the partial beam failure report is transmitted to the base station based on the instruction received from the base station.

Aspect 11 is the apparatus of any of aspects 1 to 10, where the at least one processor and the memory are further configured to transmit, to the base station, a request to activate or deactivate the partial beam failure report, where the request is transmitted via at least one of a MAC-CE or UCI.

Aspect 12 is a method of wireless communication for implementing any of aspects 1 to 11.

Aspect 13 is an apparatus for wireless communication including means for implementing any of aspects 1 to 11.

Aspect 14 is a computer-readable medium storing computer executable code, where the code when executed by a processor causes the processor to implement any of aspects 1 to 11.

Aspect 15 is an apparatus for wireless communication including at least one processor coupled to a memory and configured to transmit, to a UE, two or more RSs via two or more beams, each of the two or more RSs being transmitted via each of the two or more beams, and receive, from the UE, a partial beam failure report of the two or more beams transmitted to the UE, the partial beam failure report including at least one BFI count, each of the at least one BFI count generated for each of the two or more beams based on an estimation of a corresponding RS at the UE being greater than a threshold estimation value.

Aspect 16 is the apparatus of aspect 15, further including a transceiver coupled to the at least one processor, where the estimation of the corresponding RS includes a BLER of the corresponding RS.

Aspect 17 is the apparatus of any of aspects 15 and 16, where the partial beam failure report is periodically received from the UE, the partial beam failure report further including at least one measurement of the two or more beams.

Aspect 18 is the apparatus of any of aspects 15 to 17, where the partial beam failure report is aperiodically received from the UE based on at least one condition including the at least one BFI count being greater than or equal to a threshold BFI count, a change of at least one measurement of the two or more beams being greater than or equal to a threshold measurement value, or an instruction to transmit the partial beam failure report.

Aspect 19 is the apparatus of any of aspects 15 to 18, where the at least one processor and the memory are further configured to transmit a configuration of the partial beam failure report, the configuration including parameters including at least one of a timer, the threshold estimation value, a maximum BFI count associated with each of the two or more beams, a periodicity for transmitting the partial beam failure report, a content of the partial beam failure report, or at least one condition for transmitting the partial beam failure report.

Aspect 20 is the apparatus of aspect 19, where the configuration is transmitted via at least one of an RRC message, a MAC-CE, or DCI.

Aspect 21 is the apparatus of any of aspects 19 and 20, where the configuration includes multiple sets of parameters received via an RRC message, and the at least one processor and the memory are further configured to transmit an instruction activating one set of parameters among the multiple sets of parameters, the partial beam failure report being received based on the one set of parameters, where the instruction is transmitted via at least one of a MAC-CE or DCI.

Aspect 22 is the apparatus of any of aspects 19 to 21, where the at least one processor and the memory are further configured to receive, from the UE, a request to activate or deactivate the partial beam failure report, where the configuration is determined based at least a part on the request received from the UE, and where the request is received via at least one of a MAC-CE or UCI.

Aspect 23 is the apparatus of any of aspects 15 to 22, where the at least one processor and the memory are further configured to transmit an instruction activating the partial beam failure report, and the partial beam failure report is received from the UE based on the instruction.

Aspect 24 is the apparatus of any of aspects 15 to 23, where the at least one processor and the memory are further configured to perform beam management based on the partial beam failure report received from the UE.

Aspect 25 is a method of wireless communication for implementing any of aspects 15 to 24.

Aspect 26 is an apparatus for wireless communication including means for implementing any of aspects 15 to 24.

Aspect 27 is a computer-readable medium storing computer executable code, where the code when executed by a processor causes the processor to implement any of aspects 15 to 24.

What is claimed is:

1. An apparatus for wireless communication at a user equipment (UE), comprising:
   memory; and
   at least one processor coupled to the memory, the at least one processor and the memory configured to:
   receive, from a base station, two or more reference signals (RSs) via two or more beams, each of the two or more RSs being received via each of the two or more beams;
   generate at least two beam failure indication (BFI) counts, each of the at least two BFI counts being associated with one of the two or more beams based on an estimation of a corresponding RS being greater than a threshold estimation value; and
   transmit, to the base station, a partial beam failure report of the two or more beams, the partial beam failure report including the at least two BFI counts.

2. The apparatus of claim 1, further comprising a transceiver coupled to the at least one processor,
   wherein the estimation of the corresponding RS includes a block error rate (BLER) of the corresponding RS.

3. The apparatus of claim 1, wherein, to generate each of the at least two BFI counts, the at least one processor and the memory are configured to:
   compare the estimation of the corresponding RS to the threshold estimation value; and
   increase a corresponding BFI count of the at least two BFI count based on the estimation of the corresponding RS being greater than the threshold estimation value.

4. The apparatus of claim 1, wherein the at least one processor and the memory are further configured to:
   start a timer for each of the two or more beams based on the estimation of the corresponding RS; and
   reset a corresponding BFI count of the at least two BFI counts in response to an expiration of a corresponding timer.

5. The apparatus of claim 1, wherein the partial beam failure report is periodically transmitted to the base station, the partial beam failure report further including at least one measurement of the two or more beams.

6. The apparatus of claim 1, wherein to transmit the partial beam failure report, the at least one processor and the memory are configured to aperiodically transmit the partial beam failure report based on at least one condition including:
one of the at least two BFI counts being greater than or equal to a threshold BFI count;
a change of at least one measurement of the two or more beams being greater than or equal to a threshold measurement value; or
an instruction from the base station to transmit the partial beam failure report.

7. The apparatus of claim 1, wherein the at least one processor and the memory are further configured to:
receive a configuration of the partial beam failure report, the configuration including parameters including at least one of a timer, the threshold estimation value, a maximum BFI count associated with each of the two or more beams, a periodicity for transmitting the partial beam failure report, a content of the partial beam failure report, or at least one condition for transmitting the partial beam failure report.

8. The apparatus of claim 7, wherein to receive the configuration, the at least one processor and the memory are configured to receive the configuration via at least one of a radio resource control (RRC) message, a medium access control (MAC) control element (CE) (MAC-CE), or downlink control information (DCI).

9. The apparatus of claim 7, wherein to receive the configuration, the at least one processor and the memory are configured to receive the configuration comprising multiple sets of parameters via a radio resource control (RRC) message, and the at least one processor and the memory are further configured to:
receive an instruction activating one set of parameters among the multiple sets of parameters, the partial beam failure report being transmitted based on the one set of parameters,
via at least one of a medium access control (MAC) control element (CE) (MAC-CE) or downlink control information (DCI).

10. The apparatus of claim 1, wherein the at least one processor and the memory are further configured to: receive, from the base station, an instruction activating the partial beam failure report, and wherein to transmit the partial beam failure report, the at least one processor and the memory are configured to transmit the partial beam failure report based on the instruction.

11. The apparatus of claim 1, wherein the at least one processor and the memory are further configured to: transmit, to the base station, a request to activate or deactivate the partial beam failure report via at least one of a medium access control (MAC) control element (CE) (MAC-CE) or uplink control information (UCI).

12. An apparatus for wireless communication at a base station, comprising:
memory; and
at least one processor coupled to the memory, the at least one processor and the memory configured to:
transmit, to a user equipment (UE), two or more reference signals (RSs) via two or more beams, each of the two or more RSs being transmitted via each of the two or more beams; and
receive, from the UE, a partial beam failure report of the two or more beams transmitted to the UE, the partial beam failure report including at least two beam failure indication (BFI) counts, each of the at least two BFI counts being associated with one of the two or more beams based on an estimation of a corresponding RS at the UE being greater than a threshold estimation value.

13. The apparatus of claim 12, further comprising a transceiver coupled to the at least one processor,
wherein the estimation of the corresponding RS includes a block error rate (BLER) of the corresponding RS.

14. The apparatus of claim 12, wherein to receive the partial beam failure report, the at least one processor and the memory are configured to periodically receive the partial beam failure report from the UE, the partial beam failure report further including at least one measurement of the two or more beams.

15. The apparatus of claim 12, wherein to receive the partial beam failure report, the at least one processor and the memory are configured to aperiodically receive the partial beam failure report from the UE based on at least one condition including:
one of the at least two BFI counts being greater than or equal to a threshold BFI count;
a change of at least one measurement of the two or more beams being greater than or equal to a threshold measurement value; or
an instruction to transmit the partial beam failure report.

16. The apparatus of claim 12, wherein the at least one processor and the memory are further configured to:
transmit a configuration of the partial beam failure report, the configuration including parameters including at least one of a timer, the threshold estimation value, a maximum BFI count associated with each of the two or more beams, a periodicity for transmitting the partial beam failure report, a content of the partial beam failure report, or at least one condition for transmitting the partial beam failure report.

17. The apparatus of claim 16, wherein to transmit the configuration, the at least one processor and the memory are configured to transmit the configuration via at least one of a radio resource control (RRC) message, a medium access control (MAC) control element (CE) (MAC-CE), or downlink control information (DCI).

18. The apparatus of claim 16, wherein the configuration includes multiple sets of parameters received via a radio resource control (RRC) message, and the at least one processor and the memory are further configured to:
transmit an instruction activating one set of parameters among the multiple sets of parameters via at least one of a medium access control (MAC) control element (CE) (MAC-CE) or downlink control information (DCI), the partial beam failure report being received based on the one set of parameters.

19. The apparatus of claim 16, wherein the at least one processor and the memory are further configured to:
receive, from the UE, a request to activate or deactivate the partial beam failure report,
determine the configuration based at least a part on the request received from the UE, and
receive the request via at least one of a medium access control (MAC) control element (CE) (MAC-CE) or uplink control information (UCI).

20. The apparatus of claim 12, wherein the at least one processor and the memory are further configured to: transmit an instruction activating the partial beam failure report, and receive the partial beam failure report from the UE based on the instruction.

21. The apparatus of claim 12, wherein the at least one processor and the memory are further configured to: perform beam management based on the partial beam failure report from the UE.

22. A method of wireless communication at a user equipment (UE), comprising:
receiving, from a base station, two or more reference signals (RSs) via two or more beams, each of the two or more RSs being received via each of the two or more beams;
generating at least two beam failure indication (BFI) counts, each of the at least two BFI counts being associated with one of the two or more beams based on an estimation of a corresponding RS being greater than a threshold estimation value; and
transmitting, to the base station, a partial beam failure report of the two or more beams, the partial beam failure report including the at least two BFI counts.

23. The method of claim 22, further comprising:
receiving a configuration of the partial beam failure report, the configuration including parameters including at least one of a timer, the threshold estimation value, a maximum BFI count associated with each of the two or more beams, a periodicity for transmitting the partial beam failure report, a content of the partial beam failure report, or at least one condition for transmitting the partial beam failure report.

24. The method of claim 23, wherein the configuration includes multiple sets of parameters received via a radio resource control (RRC) message, and the method further comprises:
receiving an instruction activating one set of parameters among the multiple sets of parameters, the partial beam failure report being transmitted based on the one set of parameters,
wherein the instruction is received via at least one of a medium access control (MAC) control element (CE) (MAC-CE) or downlink control information (DCI).

25. The method of claim 22, further comprising:
receiving, from the base station, an instruction activating the partial beam failure report, and the partial beam failure report is transmitted to the base station based on the instruction received from the base station.

26. The method of claim 22, further comprising:
transmitting, to the base station, a request to activate or deactivate the partial beam failure report, wherein the request is transmitted via at least one of a medium access control (MAC) control element (CE) (MAC-CE) or uplink control information (UCI).

27. A method of wireless communication at a base station, comprising:
transmitting, to a user equipment (UE), two or more reference signals (RSs) via two or more beams, each of the two or more RSs being transmitted via each of the two or more beams; and
receiving, from the UE, a partial beam failure report of the two or more beams transmitted to the UE, the partial beam failure report including at least two beam failure indication (BFI) counts, each of the at least two BFI counts being associated with one of the two or more beams based on an estimation of a corresponding RS at the UE being greater than a threshold estimation value.

28. The method of claim 27, further comprising:
transmitting a configuration of the partial beam failure report, the configuration including parameters including at least one of a timer, the threshold estimation value, a maximum BFI count associated with each of the two or more beams, a periodicity for transmitting the partial beam failure report, a content of the partial beam failure report, or at least one condition for transmitting the partial beam failure report.

29. The method of claim 28, further comprising:
receiving, from the UE, a request to activate or deactivate the partial beam failure report,
wherein the configuration is determined based at least a part on the request received from the UE, and
wherein the request is received via at least one of a medium access control (MAC) control element (CE) (MAC-CE) or uplink control information (UCI).

30. The method of claim 27, further comprising:
performing beam management based on the partial beam failure report received from the UE.

* * * * *